US011994821B2

(12) United States Patent
Imanishi

(10) Patent No.: US 11,994,821 B2
(45) Date of Patent: May 28, 2024

(54) IMAGE FORMING APPARATUS AND CONTROL METHOD

(71) Applicant: BROTHER KOGYO KABUSHIKI KAISHA, Nagoya (JP)

(72) Inventor: Yosuke Imanishi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/185,178

(22) Filed: Mar. 16, 2023

(65) Prior Publication Data

US 2023/0314997 A1 Oct. 5, 2023

(30) Foreign Application Priority Data

Apr. 1, 2022 (JP) ................................ 2022-062144

(51) Int. Cl.
*G03G 15/00* (2006.01)

(52) U.S. Cl.
CPC .................................. *G03G 15/553* (2013.01)

(58) Field of Classification Search
CPC .................................................... G03G 15/553
USPC ........................................................... 399/12
See application file for complete search history.

(56) References Cited

U.S. PATENT DOCUMENTS

2018/0131831 A1 5/2018 Tolia et al.
2020/0225885 A1* 7/2020 Akimoto ................ G06Q 30/06
2022/0097399 A1* 3/2022 Yamada ................ G03G 15/55
2022/0171583 A1 6/2022 Suzuki

FOREIGN PATENT DOCUMENTS

JP 2022-85744 A 6/2022

* cited by examiner

*Primary Examiner* — Hoan H Tran
(74) *Attorney, Agent, or Firm* — Merchant & Gould P.C.

(57) ABSTRACT

A first memory stores type information and identification information. The type information indicates whether a consumable is a contract consumable or a normal consumable. The identification information is unique information for identifying the consumable. A replacement part is used in an image forming apparatus together with the consumable. The replacement part includes a second memory. A controller is configured to: determine whether a contract cancel instruction has been received, the contract cancel instruction being an instruction for cancelling contract for the image forming apparatus; in response to determining that the contract cancel instruction has been received, determine whether the type information is information indicating the contract consumable; and in response to determining that the type information is information indicating the contract consumable, store the identification information in the second memory. This allows a use of the consumable in another image forming apparatus together with the replacement part.

11 Claims, 11 Drawing Sheets

IMAGE FORMING APPARATUS AND CONTROL METHOD

REFERENCE TO RELATED APPLICATIONS

This application claims priority from Japanese Patent Application No. 2022-062144 filed on Apr. 1, 2022. The entire content of the priority application is incorporated herein by reference.

BACKGROUND ART

In recent years, flat-rate printing services have been provided to users of image forming apparatuses.

DESCRIPTION

A flat-rate printing service is also called a subscription service, and is a service that may be subscribed to for each image forming apparatus. For example, in an image forming apparatus which is a contracted apparatus for which a contract regarding a use of a flat-rate printing service has been made, printing is permitted up to a preset number of sheets for a certain usage fee during a particular period.

Generally, when using a flat-rate printing service, a service provider often specifies that contract consumables dedicated for the flat-rate printing service should be used in a contracted image forming apparatus. In this case, a mechanism is required to ensure proper use of contract consumables in contracted apparatuses.

In order to ensure proper use of contract consumables, for example, it is conceivable to distinguish between contract consumables and normal consumables that can be used regardless of subscription to a service. Also, it is conceivable to associate and manage contract consumables and contracted apparatuses so that contract consumables are used in specific contracted apparatuses.

In this case, there is a problem that operations performed by the user become complicated when changing the contracted apparatus. In view of the foregoing, an example of an object of this disclosure is to enable a user to easily switch from an image forming apparatus currently used by the user to an image forming apparatus to be used instead of the image forming apparatus currently used by the user.

According to one aspect, this specification discloses an image forming apparatus. The image forming apparatus includes a main housing, a consumable, a replacement part, and a controller. The consumable is attachable to the main housing. The consumable includes a first memory. The first memory stores type information and identification information. The type information indicates whether the consumable is a contract consumable or a normal consumable. The contract consumable is a consumable that is usable when a contract for the image forming apparatus is made. The normal consumable is a consumable that is usable regardless of whether the contract is made. The identification information is unique information for identifying the consumable. The replacement part is used in the image forming apparatus together with the consumable. The replacement part includes a second memory. The controller is configured to: determine whether a contract cancel instruction has been received, the contract cancel instruction being an instruction for cancelling the contract for the image forming apparatus; in response to determining that the contract cancel instruction has been received, determine whether the type information is information indicating the contract consumable; and in response to determining that the type information is information indicating the contract consumable, store the identification information in the second memory. The storing the identification information in the second memory allows a use of the consumable in another image forming apparatus together with the replacement part.

Here, the image forming apparatus currently used by a user is referred to as an old apparatus, and an image forming apparatus which a user plans to use in place of the old apparatus and which is different from the old apparatus is referred to as a new apparatus. The controller of the new apparatus is configured to: determine whether the image forming apparatus is in a state where the contract is made; determine whether the type information is information indicating the contract consumable; in response to determining that the image forming apparatus is in a state where the contract is made and determining that the type information is information indicating the contract consumable, determine whether the second memory stores the first identification information; in response to determining that the second memory stores the first identification information, write the first identification information stored in the second memory to the apparatus memory; and after writing the first identification information stored in the second memory to the apparatus memory, permit a use of the consumable in the image forming apparatus together with the replacement part. Thus, when a user attaches the consumable and the replacement part having been used in the old apparatus to the new apparatus, the new apparatus permits a use of the consumable based on the identification information stored in the second memory. This allows the user to use the consumable in the new apparatus by simply attaching the consumable and the replacement part used in the old apparatus to the new apparatus. This enables an easy transition from the old apparatus to the new apparatus.

According to another aspect, this specification also discloses a control method of controlling the image forming apparatus. Further, the image forming apparatus according to each aspect of the present disclosure may be realized by a computer. In this case, a control program for realizing an image forming apparatus with a computer by operating the computer as each part (software element) included in the image forming apparatus and a computer-readable recording medium recording such program are also included in the scope of the present disclosure.

An embodiment of the present disclosure will be described below with reference to FIGS. 1 to 11. In this embodiment, as an example, a case where an image forming apparatus 1 is a laser printer and image formation is printing will be described. However, the image forming apparatus may be a printer other than a laser printer. For example, the image forming apparatus 1 may be an inkjet printer.

[Overview of Image Forming System]

Figure 1:
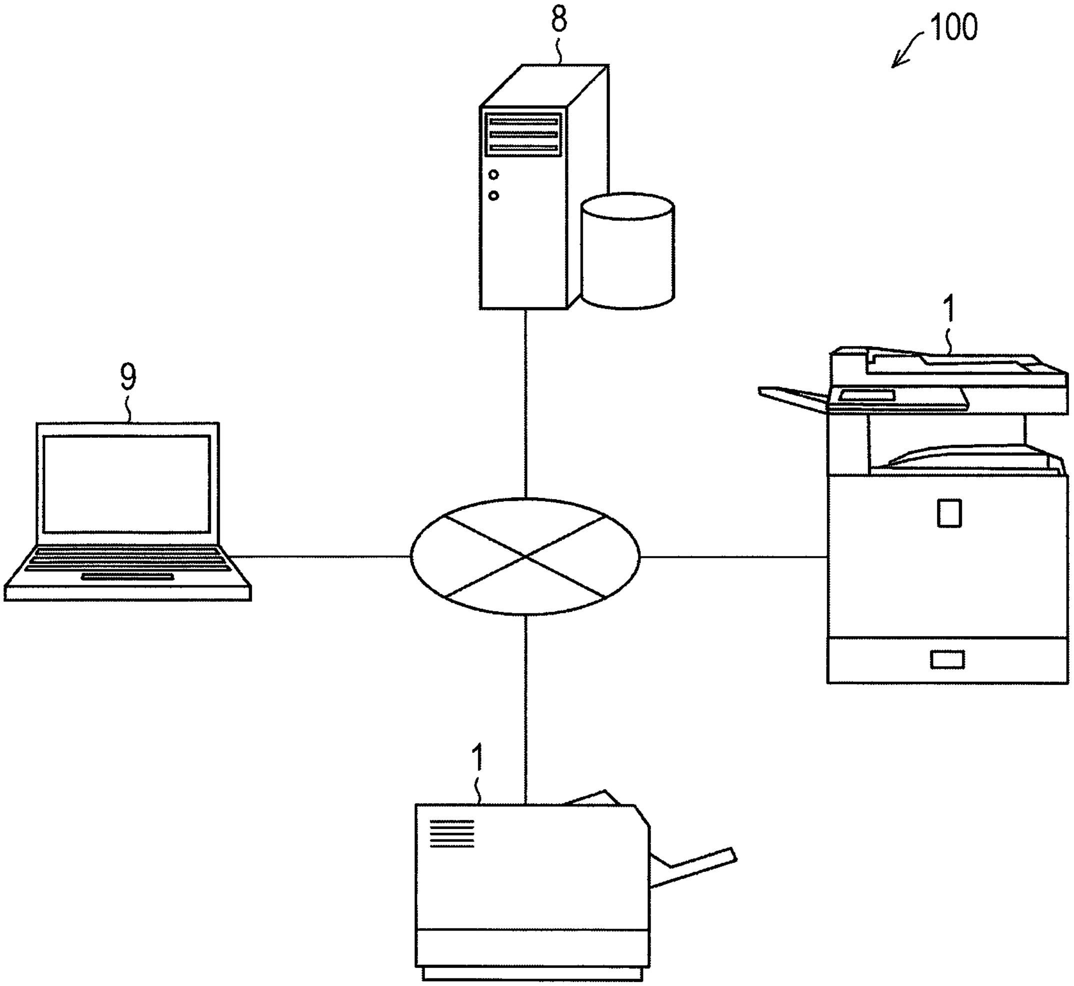
FIG. 1 is a diagram showing an overview of an image forming system.

FIG. 1 shows an overview of an image forming system 100 according to this embodiment. As shown in FIG. 1, the image forming system 100 includes a plurality of image forming apparatuses 1, a server 8, and a user terminal 9. The plurality of image forming apparatuses 1 shown in FIG. 1 are purchased by the same user. However, although not shown, the image forming system 100 may include still another image forming apparatus purchased by another user.

The image forming apparatus 1 is an apparatus for implementing services provided by a contract for the image forming apparatus 1. The server 8 is an external apparatus that communicates with the image forming apparatus 1 via a network, and is an example of a management apparatus that manages the image forming apparatus 1. In this embodiment, the server 8 is a server managed by a company.

A "contract" in the present embodiment is a contract made between a user and a company, in which the company provides a particular service via the image forming apparatus 1 specified by the user. In other words, it can be said that the user makes a contract for a certain image forming apparatus 1. Further, it can be said that the image forming apparatus 1 is an apparatus of the target of contract. Hereinafter, the image forming apparatus 1 specified by the user and subject to the contract will be referred to as a "contracted apparatus (contract target apparatus)".

In each of the plurality of image forming apparatuses 1, contract-dedicated consumables are usable when the user makes a contract with the company. As an example, a contract is an agreement between a user and a company that provides a contract service that the company provides the service to the user by setting the period of use of the service, the usage fee, the maximum number of sheets, and so on. That is, the image forming apparatus 1 of the present embodiment is an image forming apparatus that is allowed to, after a service contract is made, perform contract printing which is printing based on the content of the contract.

The user is allowed to register or change the image forming apparatus 1 as a contracted apparatus at any timing. The "registration" referred to here may be new registration or re-registration of an image forming apparatus 1 that has been previously registered and whose contract has been cancelled. Also, the user is allowed to register a plurality of image forming apparatuses 1 as contracted apparatuses. That is, the user can simultaneously use a plurality of image forming apparatuses 1 as contracted apparatuses, or change the image forming apparatus 1 used as a contracted apparatus from one image forming apparatus 1 to another image forming apparatus 1.

The user terminal 9 used by the user is an apparatus for communicating with the server 8 to make and cancel a contract and execute other procedures. The user terminal 9 may be, for example, an information processing terminal having a standard communication function, such as a PC (personal computer) or a smart phone. Each apparatus constituting the image forming system 100 communicates with each other via a communication network such as the Internet.

[Overview of Structure of Image Forming Apparatus 1]

Figure 2:
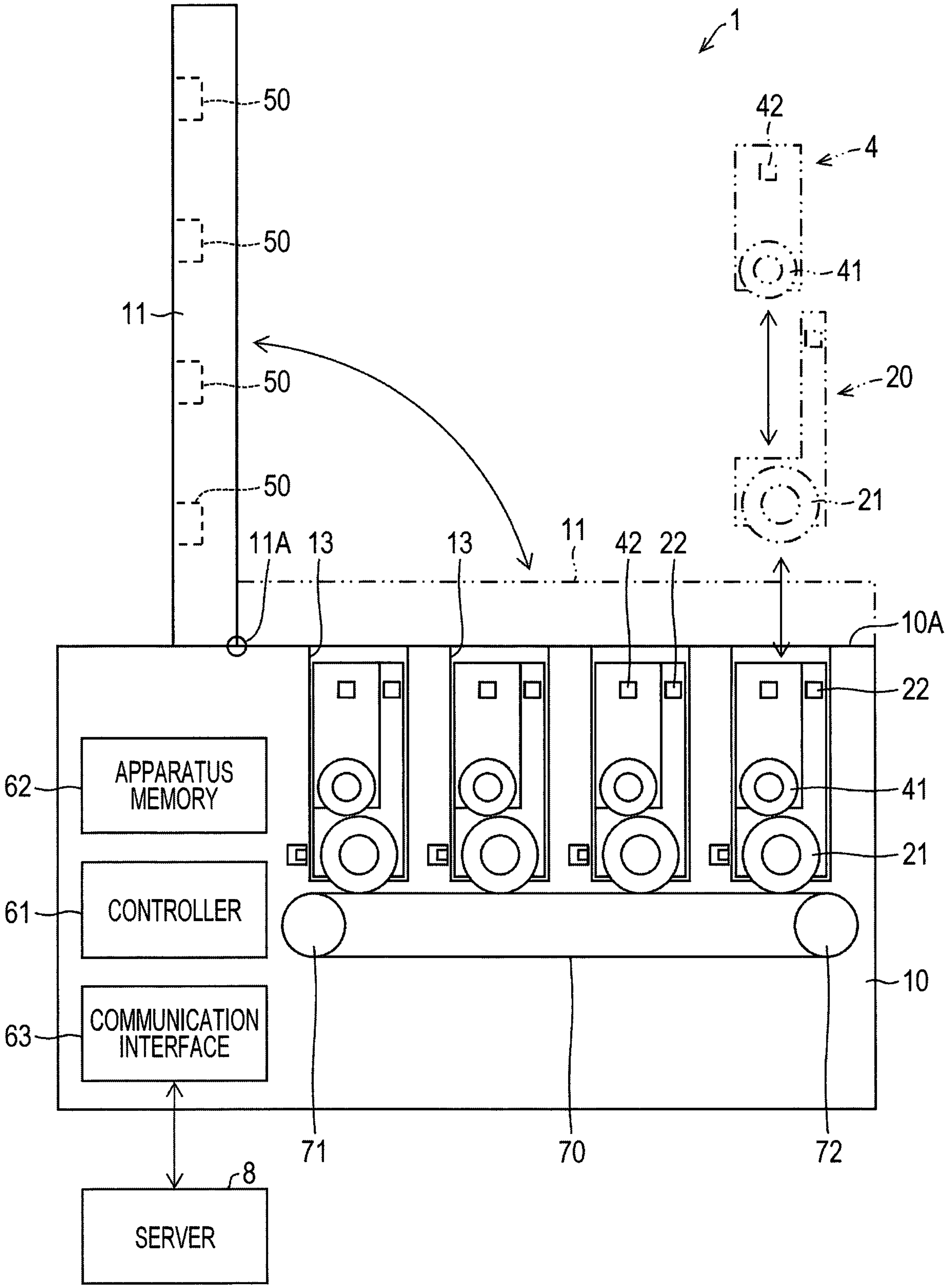
FIG. 2 is a schematic diagram of an image forming apparatus included in the image forming system.
Figure 3:
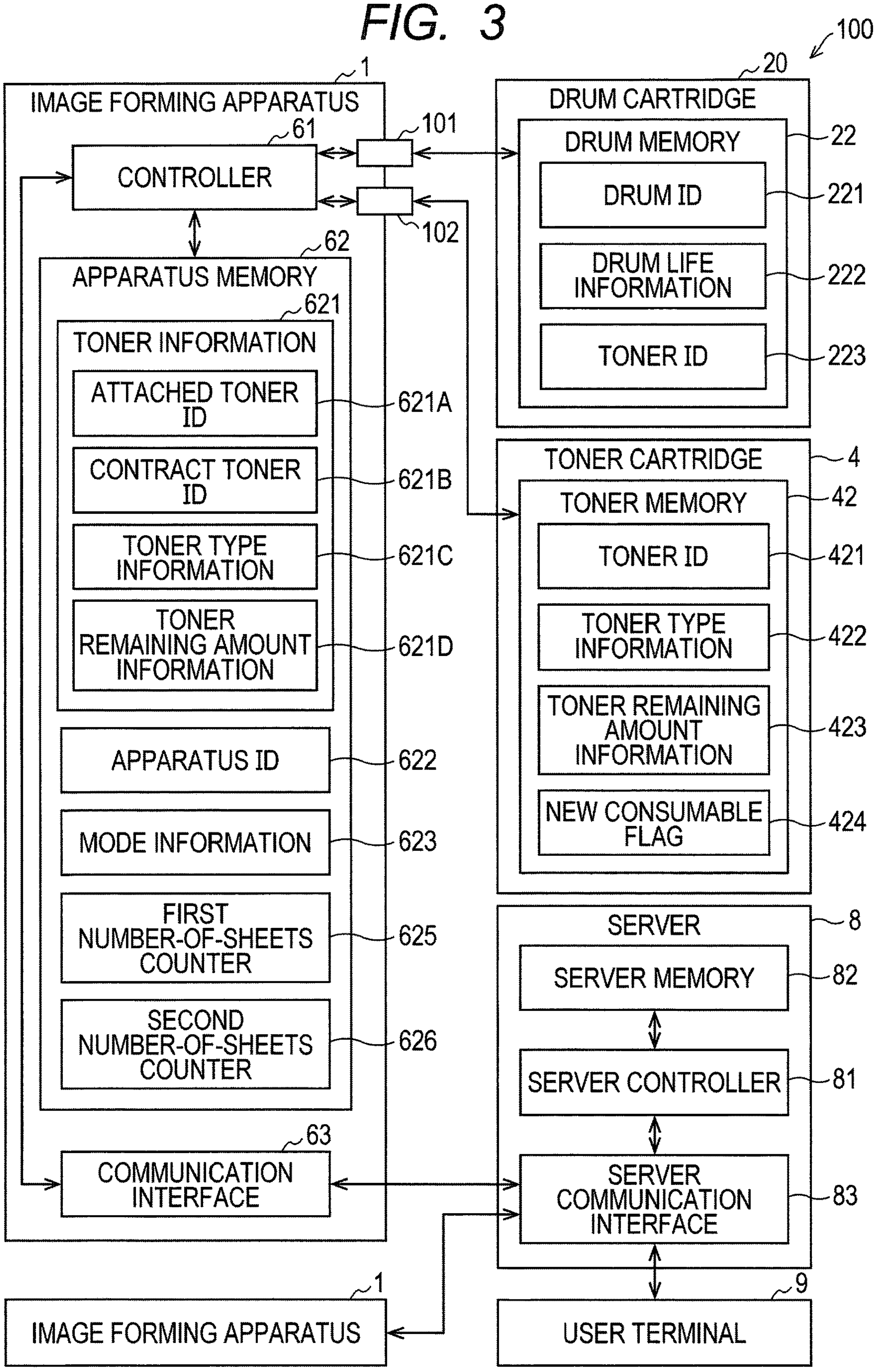
FIG. 3 is a diagram showing internal structures of a server and the image forming apparatus including a drum cartridge and a toner cartridge, and a connection relationship between the image forming apparatus and the server.

FIG. 2 shows a schematic configuration of the image forming apparatus 1. FIG. 3 shows internal structures of the image forming apparatus 1 including drum cartridges 20 and toner cartridges 4 and the server 8, and a connection relationship between the image forming apparatus 1 and the server 8. Although two image forming apparatuses 1 are included in FIG. 3, each image forming apparatus 1 has the same configuration.

As shown in FIG. 2, the image forming apparatus 1 includes a main housing 10 and a cover 11. Although not shown, the image forming apparatus 1 may be provided with a display such as a liquid crystal display or a lamp, and an input interface such as a button. The liquid crystal display may be configured to function as an input interface by being configured integrally with a touch panel.

[Main Housing 10]

In the main housing 10 of the image forming apparatus 1, the toner cartridges 4 are attached. That is, the toner cartridges 4 are used in the image forming apparatus 1. Although details will be described later, each toner cartridge 4 is integrated with the drum cartridge 20 by being attached to the drum cartridge 20. That is, the toner cartridge 4 is attached to the main housing 10 together with the drum cartridge 20 in a state where the toner cartridge 4 is attached to the drum cartridge 20. In other words, drum the cartridge 20 is a part (component) used in the image forming apparatus 1 together with the toner cartridge 4. In this way, the image forming apparatus 1 including the drum cartridges 20 and the toner cartridges 4 is realized.

In the image forming apparatus 1 of this embodiment, four toner cartridges 4 need to be attached to perform printing. That is, the image forming apparatus 1 of the present embodiment is configured that four drum cartridges 20 and four toner cartridges 4 are attachable. However, the number of drum cartridges 20 and toner cartridges 4 attached to the image forming apparatus 1 is not limited to the example of FIG. 2. For example, the image forming apparatus 1 may be a monochrome printer in which one drum cartridge 20 and one toner cartridge 4 are attachable.

The toner cartridge 4 contains toner that the image forming apparatus 1 consumes during printing. That is, the toner cartridge 4 is a consumable for the image forming apparatus 1. Further, the drum cartridge 20 includes a photosensitive drum 21 used during printing by the image forming apparatus 1. The drum cartridge 20 is also an example of a replacement part for the image forming apparatus 1.

The main housing 10 has, for example, a rectangular box shape. The four drum cartridges 20, the four toner cartridges 4, a transfer belt 70, a controller 61, an apparatus memory 62, and a communication interface 63 are accommodated in the main housing 10. The main housing 10 includes four cartridge holding portions 13. The cartridge holding portion 13 is formed in a concave shape and has an opening. The drum cartridge 20 and the toner cartridge 4 are attached to the main housing 10 by being held by the cartridge holding portion 13.

[Cover 11]

The cover 11 of the image forming apparatus 1 is provided with light source units 50 corresponding to respective ones of the drum cartridges 20. That is, the image forming apparatus 1 includes four light source units 50. The cover 11 is pivotable (movable) about a pivot shaft 11A extending in a first direction between an open position that opens the opening 10A indicated by the solid line in FIG. 1 and a closed position that closes the opening 10A indicated by the two-dot chain line in FIG. 2. The pivotal movement of the cover 11 opens and closes the opening 10A provided at an upper end of the main housing 10.

The "first direction" indicates a direction in which a rotation center axis (development axis) of a development roller in a toner cartridge extends. When the cover 11 is arranged at the open position, each opening of the cartridge holding portions 13 is opened. When the cover 11 is arranged at the closed position, each opening of the cartridge holding portions 13 is covered with the cover 11.

The main housing 10 may be provided with a close sensor (not shown) at the opening 10A. The close sensor is a sensor that detects that the cover 11 is in the closed position. The close sensor may be, for example, a contact sensor or an optical sensor.

[Toner Cartridge 4]

The toner cartridge 4 includes a cartridge housing for accommodating the development roller 41 and developer (for example, toner) as an example of printing material. The cartridge housing is attachable to the main housing 10. The four toner cartridges 4 contain developers of different colors (for example, cyan, magenta, yellow, and black) as materials used for image formation. The developer is consumable material that decreases with use. The developing roller 41 is a cylindrical member extending in the first direction, and is rotatable around a development shaft extending in the first direction. When the toner cartridge 4 is attached to the drum cartridge 20, the outer peripheral surface of the photosensitive drum 21 comes into contact with the outer peripheral surface of the development roller 41.

The toner cartridge 4 also includes a toner memory 42 as an example of a consumable memory. The toner memory 42 is arranged on the outer surface of one side of the toner cartridge 4 in the first direction. The toner memory 42 is a memory from which information is read and to which information is written, such as a flash ROM (Read Only Memory) or an EEPROM (Electronically Erasable and Programmable Read Only Memory).

The toner memory 42 includes a first area 421, a second area 422, a third area 423, and a fourth area 424 in order to store information about the toner cartridge 4. The toner memory 42 stores a toner ID in the first area 421. The toner memory 42 stores toner type information in the second area 422. The toner memory 42 stores toner remaining amount information in the third area 423. The toner memory 42 stores a new consumable flag in the fourth area 424. The third area 423 and the fourth area 424 may be rewritable with data.

The toner ID is, for example, unique identification information for identifying each toner cartridge 4. The toner ID may be a unique serial number of each toner cartridge 4. The toner ID may include information indicating the color of each toner cartridge 4.

The toner type information is an example of type information representing the type of the toner cartridge 4. In this embodiment, there are two types of toner cartridges 4. One is a "contract cartridge (contract-dedicated cartridge)" that is usable only with a contracted apparatus. In other words, the contract cartridge is an example of a contract consumable that is usable when a contract for the image forming apparatus 1 is made. The other is a "normal cartridge" that is usable even with the image forming apparatus 1 that is not a contracted apparatus. In other words, the normal cartridge is an example of normal consumables that is usable regardless of existence of a contract. The toner type information may be included in the toner ID. That is, the toner ID may include information identifying each toner cartridge 4 and information indicating the type of each toner cartridge 4.

The toner remaining amount information is information indicating the remaining amount of toner in the toner cartridge 4. The remaining amount of toner includes, for example, a value corresponding to one of a plurality of stages from full to empty, and the value is stored in the third area 423. Each stage of the remaining amount of toner stored in the toner memory 42 may be a character string such as "FULL" to "EMPTY", or a numerical value "100%" to "0%", or information combining a character string and a numerical value, based on the values described above.

The new consumable flag is an example of status information indicating that the toner cartridge 4 is a new consumable or a used consumable (old consumable). For example, a value of "1" for the new consumable flag may mean that the toner cartridge 4 is a new consumable, and a value of "0" for the new consumable flag may mean that the toner cartridge 4 is a used consumable.

[Drum Cartridge 20]

The drum cartridge 20 includes a cartridge housing that is attachable to the main housing 10. The cartridge housing includes a photosensitive drum 21 as a component used for image formation. The photosensitive drum 21 is a replacement part that needs to be replaced because deterioration such as wear of the surface occurs with use. The photosensitive drum 21 is a cylindrical photoreceptor extending in the first direction. The photosensitive drum 21 is rotatable around a drum shaft extending in the first direction. The outer peripheral surface of the photosensitive drum 21 is covered with a photosensitive material.

The drum cartridge 20 may also include a drum memory 22 as an example of a second memory. The drum memory 22 is a memory from which information is read and to which information is written. The drum memory 22 is, for example, a flash ROM or an EEPROM.

The drum memory 22 includes a first area 221 and a second area 222 for storing information regarding the photosensitive drum 21 of the drum cartridge 20. The drum memory 22 may store a drum ID in the first area 221. The drum memory 22 may store drum life information in the second area 222. The drum ID is a unique serial number for identifying each drum cartridge 20. The drum life information is information indicating the life of the photosensitive drum 21.

The drum memory 22 also includes a third area 223 configured to store a toner ID stored in the toner memory 42 of the toner cartridge 4 attached to the drum cartridge 20. As will be described later, the controller 61 stores, into the drum memory 22, the toner ID stored in the toner memory 42 in a case where the toner cartridge 4 is a contract consumable (contract-dedicated consumable) and is a used consumable.

[Attachment of Cartridge and Printing Mechanism]

As shown in FIG. 2, the drum cartridges 20 and the toner cartridges 4 are attached in the main housing 10 in a state where the cover 11 is located at the open position. In this state, the drum cartridges 20 and the toner cartridges 4 are inserted into the cartridge holding portions 13 through the opening 10A.

The main housing 10 includes connectors 101 and 102. When the connector 101 is electrically connected to the drum memory 22 in a state where the drum cartridge 20 is inserted in the cartridge holding portion 13, the controller 61 of the main housing 10 communicates with the drum memory 22 of the drum cartridge 20. When the connector 102 is electrically connected to the toner memory 42 in a state where the toner cartridge 4 is attached to the main housing 10, the controller 61 of the main housing 10 communicates with the toner memory 42 of the toner cartridge 4.

The four light source units 50 are attached to the inner surface of the cover 11. Each light source unit 50 is arranged to face the surface of the photosensitive drum 21 in a state where the drum cartridge 20 is attached to the main housing 10 and the cover 11 is located at the closed position. The light source unit 50 includes a plurality of light sources arranged in the first direction. The light sources irradiate the outer peripheral surface of the photosensitive drum 21 with light. The light sources are, for example, LEDs (Light Emitting Diodes).

The light source unit 50 is electrically connected to the controller 61. The controller 61 causes the plurality of light sources of the light source unit 50 to emit light according to input image data. The light source irradiates light toward the outer peripheral surface of the photosensitive drum 21. As a result, the photosensitive material on the outer peripheral surface of the photosensitive drum 21 is exposed according to the image data.

The transfer belt 70 is a component that transfers developer (for example, toner) on the surface of the photosensitive drum 21 to printing paper. The transfer belt 70 is a replacement part that needs to be replaced due to wear of its surface and other deterioration as it is used. The transfer belt 70 is a belt configured to contact the photosensitive drum 21 and has an annular shape (endless belt). The outer peripheral surface of the photosensitive drum 21 is configured to contact the outer peripheral surface of the transfer belt 70. During a printing process, printing paper is conveyed between the transfer belt 70 and the photosensitive drums 21.

The transfer belt 70 is stretched between a drive roller 71 and a follow roller 72. The drive roller 71 drives the transfer belt 70. The controller 61 causes the drive roller 71 to rotate. The follow roller 72 rotates by following movement of the transfer belt 70 due to driving of the drive roller 71.

[Internal Structure of Main Housing]

The controller 61 includes, for example, an ASIC (Application Specific Integrated Circuit). The controller 61 is electrically connected to each of the apparatus memory 62 provided in the main housing 10 and the communication interface 63. The controller 61 causes the image forming apparatus 1 to perform a printing process and associated processes by executing various types of processing.

The controller 61 may include a processor such as a CPU (Central Processing Unit). In this case, the apparatus memory 62 may store a control program for implementing a print control method. And, the processor of the controller 61 may operate according to the control program stored in the apparatus memory 62 to execute the printing process in the image forming apparatus 1.

The controller 61 itself may include a computer-readable recording medium storing a control program. As a recording medium, a "non-temporary tangible medium" such as a ROM (Read Only Memory), a tape, a disk, a card, a semiconductor memory, a programmable logic circuit, and so on may be used. Further, a RAM (Random Access Memory) for expanding the control program may be used as the recording medium.

The control program may be supplied to the computer via any transmission medium (communication network, broadcast wave, and so on) capable of transmitting the control program. It should be noted that one aspect of the present disclosure may also be embodied in the form of a data signal embedded in a carrier wave in which the control program is embodied by electronic transmission.

When the drum cartridge 20 and the toner cartridge 4 are attached to the cartridge holding portion 13 of the main housing 10, the drum memory 22 and the toner memory 42 are electrically connected to the controller 61 as shown in FIG. 3. The controller 61 performs reading information from the connected drum memory 22 and toner memory 42 and writing and/or rewriting information to the drum memory 22 and toner memory 42.

The apparatus memory 62 is a memory from which information is read and to which information is written. The apparatus memory 62 is, for example, a flash ROM or an EEPROM. The apparatus memory 62 includes a first area 621 for storing toner information, a second area 622 for storing an apparatus ID, a third area 623 for storing mode information, a fourth area 625 for storing a first number-of-sheets counter, and a fifth area 626 for storing a second number-of-sheets counter.

The toner information is information on each toner cartridge 4 attached to the image forming apparatus 1. For example, the toner information may be data in which a toner ID read from a certain toner memory 42 is associated with toner type information and toner remaining amount information read from the same toner memory 42. The apparatus memory 62 may store the data associated in this manner for each toner cartridge 4 in the first area 621. That is, the apparatus memory 62 may have the first area 621 for each toner cartridge 4 to be attached, that is, for each cartridge holding portion 13.

In order to store the toner ID, the toner type information, and the toner remaining amount information as the toner information, the first area 621 may include an eleventh area 621A, a twelfth area 621B, a thirteenth area 621C, and a fourteenth area 621D.

The eleventh area 621A is an area for storing, as an attached toner ID, the toner ID of the toner cartridge 4 that is attached to the image forming apparatus 1 and that the controller 61 allows to be used in the image forming apparatus 1.

The twelfth area 621B is an area for storing, as a contract toner ID, the toner ID of a contract cartridge that the controller 61 allows to be used in the image forming apparatus 1. The twelfth area 621B may be an area for storing the toner ID of a new contract cartridge attached to the image forming apparatus 1 and the toner ID of a used contract cartridge attached to the image forming apparatus 1 in the past and allowed to be used in the image forming apparatus 1 by the controller 61. The first area 621 may include an area for storing the toner ID of a normal cartridge.

The thirteenth area 621C is an area for storing the toner type information. The fourteenth area 621D is an area for storing the toner remaining amount information.

The apparatus ID is identification information for identifying the image forming apparatus 1. The apparatus ID may be a serial number of the image forming apparatus 1, for example.

The mode information is information indicating an operation mode of the image forming apparatus 1. In the present embodiment, it is assumed that the mode information is one of two modes including "contract mode" which means that the image forming apparatus 1 is registered as a contracted apparatus, and "normal mode" which means that the image forming apparatus 1 is not registered as a contracted apparatus or a contract has been canceled. In other words, the "contract mode" means that the image forming apparatus 1 operates on the image forming system 100 as a contracted apparatus. The "normal mode" means that the image forming apparatus 1 operates not as a contracted apparatus but as a normal image forming apparatus without a contract. When the image forming apparatus 1 is shipped, a value corresponding to the normal mode is stored in the third area 623 as an initial value. The controller 61 appropriately rewrites (changes) the mode information.

A first number-of-sheets counter may be stored in the fourth area 625. The first number-of-sheets counter is the total number of printed sheets in the image forming apparatus 1. A second number-of-sheets counter may be stored in the fifth area 626. The second number-of-sheets counter indicates the number of printed sheets printed by the image forming apparatus 1 under contract printing (printing on a contract basis). The second number-of-sheets counter may be reset to 0 each time the image forming apparatus 1 shifts from the contract mode to the normal mode, or may be the total number of printed sheets that have been printed under contract printing in the image forming apparatus 1 so far.

The communication interface 63 is a communication interface that performs communication between the image forming apparatus 1 and the server 8. The communication interface 63 outputs various data, notifications, and requests received from the server 8 to the controller 61. The communication interface 63 transmits various data, notifications, and requests input from the controller 61 to the server 8.

[User Terminal 9]

The user terminal 9 includes an input interface for accepting various user input operations and a communication interface for communicating with the server 8. The user registers a contracted apparatus in the server 8 by performing an input operation via the user terminal 9. For example, the user inputs, to the user terminal 9, his/her own identification information and the identification information of the image forming apparatus 1 to be contracted. Upon receiving the input, the user terminal 9 transmits the input information to the server 8.

The user terminal 9 may accept an input operation related to changing the contracted apparatus in addition to registering the contracted apparatus (that is, adding the contracted apparatus). For example, the user terminal 9 may accept a user's input operation for inputting the user's own identification information, the identification information of the contracted apparatus after a contract change, and the identification information of the contracted apparatus before the contract change. Then, these three types of information may be transmitted to the server 8.

[Server 8]

The server 8 is a management apparatus that manages the operating state of the image forming apparatus 1. The server 8 includes a server communication interface 83, a server memory 82, and a server controller 81. The server controller 81 is a CPU that controls overall operations of the server 8. The server memory 82 is a storage device that stores data necessary for the server 8 to operate.

The server memory 82 may have an area for storing apparatus information and an area for storing a registration table. The server controller 81 may store the apparatus information or update the registration table in response to a notification or request received from the image forming apparatus 1 or the user terminal 9.

The apparatus information is data in which various types of information regarding the image forming apparatus 1 are collected. The apparatus information is stored separately for each image forming apparatus 1. The apparatus information includes at least an apparatus ID. The registration table is a data table in which the image forming apparatus 1 designated by the user as a contracted apparatus is registered (stored). The registration table is also data indicating whether the image forming apparatus 1 is under contract.

The server communication interface 83 is a communication interface that performs communication between the server 8 and the user terminal 9 and the image forming apparatus 1. The server communication interface 83 outputs various data, notifications, and requests received from the image forming apparatus 1 or the user terminal 9 to the server controller 81. The server communication interface 83 transmits various data, notifications, and requests input from the server controller 81 to the image forming apparatus 1 or the user terminal 9.

[Rewriting of Information in Contracted Apparatus Depending on Type and Status of Toner Cartridge]

Figure 4A:
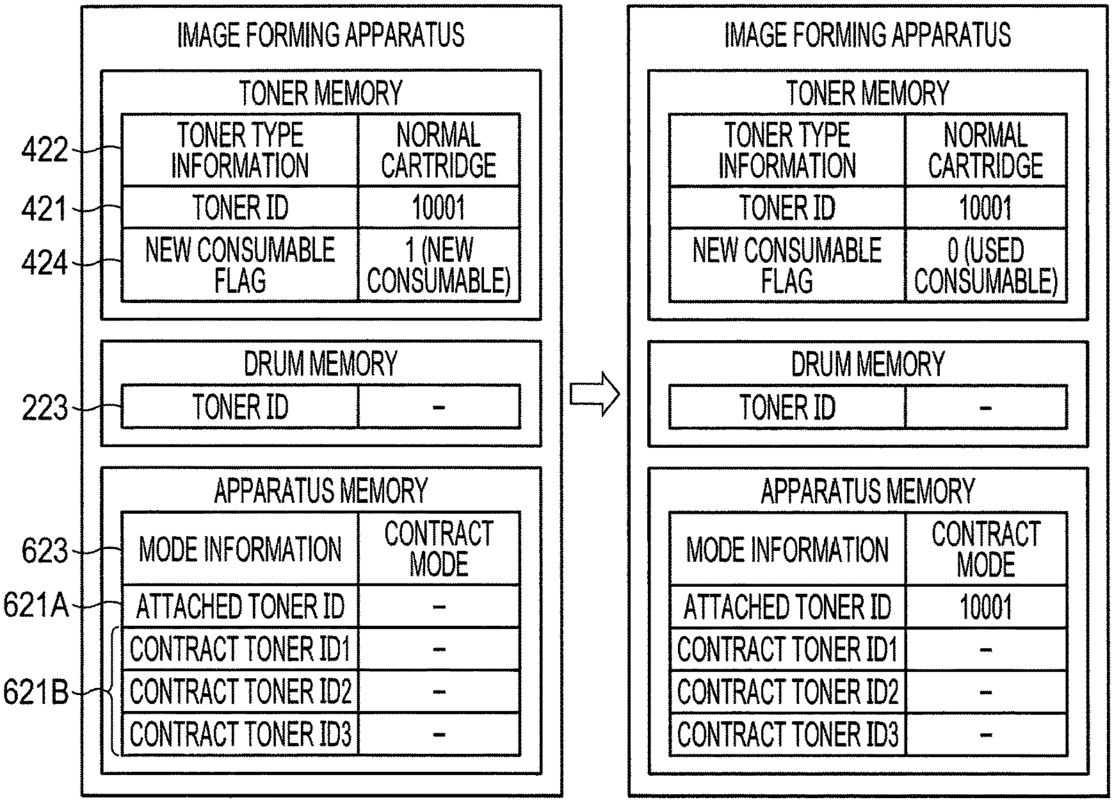
FIGS. 4A and 4B are diagrams showing examples of rewriting information in the image forming apparatus when the toner cartridge attached to a main housing is a normal cartridge.
Figure 4B:
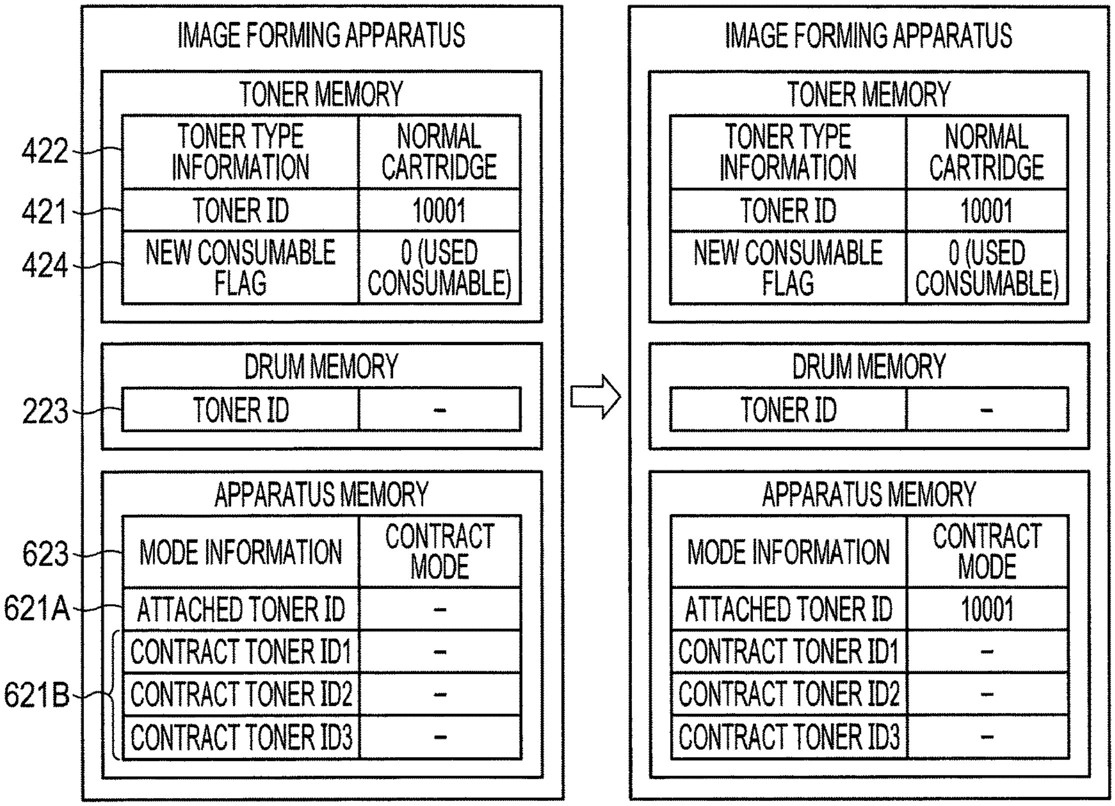
Figure 5:
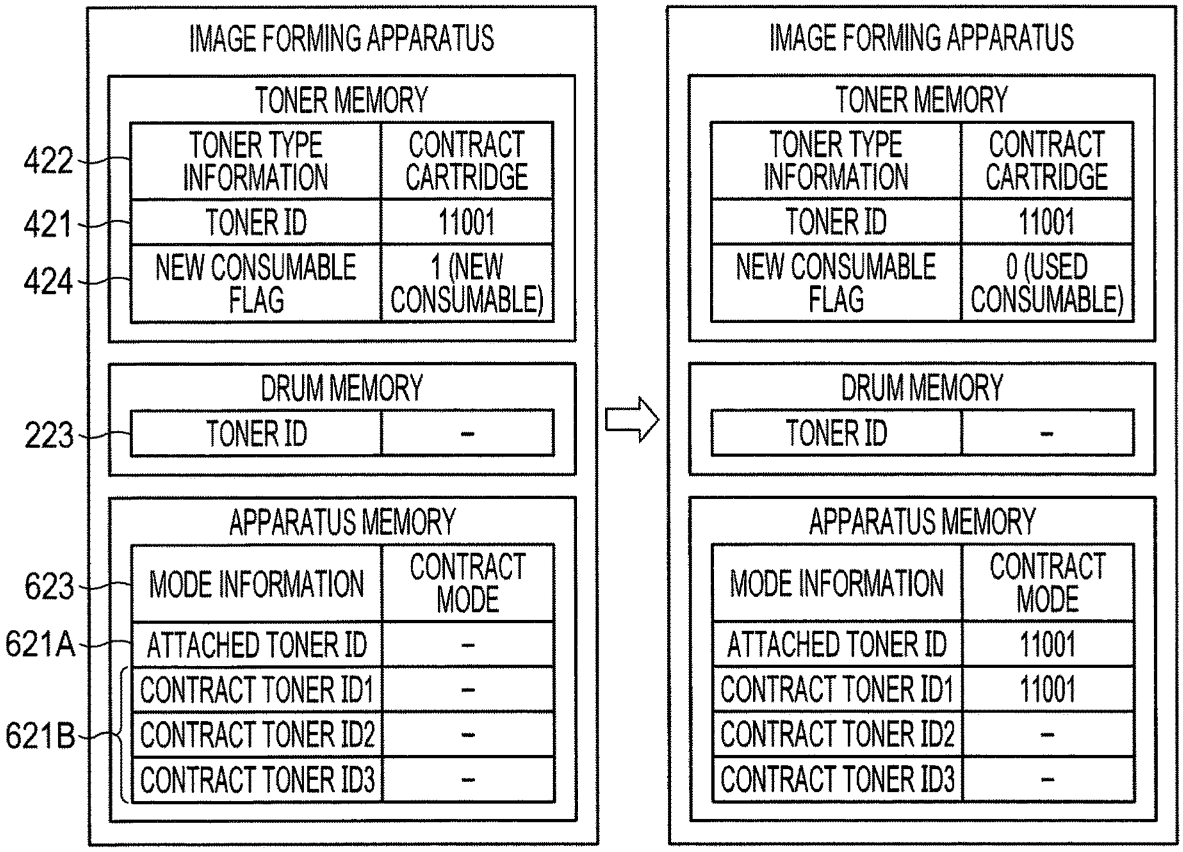
FIG. 5 is a diagram showing an example of rewriting information in the image forming apparatus when the toner cartridge attached to the main housing is a new contract cartridge.
Figure 6A:
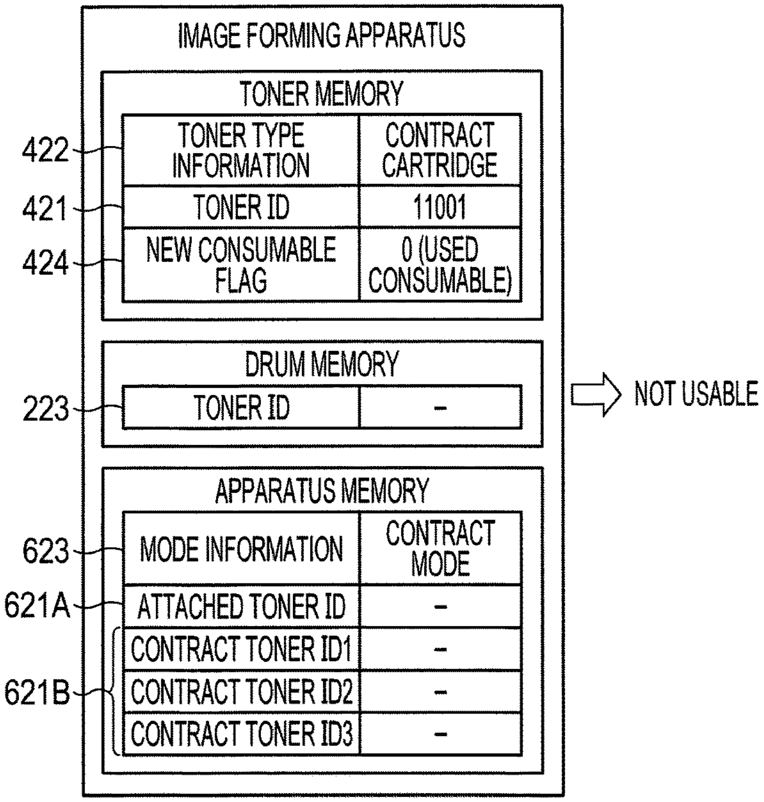
FIGS. 6A and 6B are diagrams showing examples of rewriting information in the image forming apparatus when the toner cartridge attached to the main housing is a used contract cartridge.
Figure 6B:
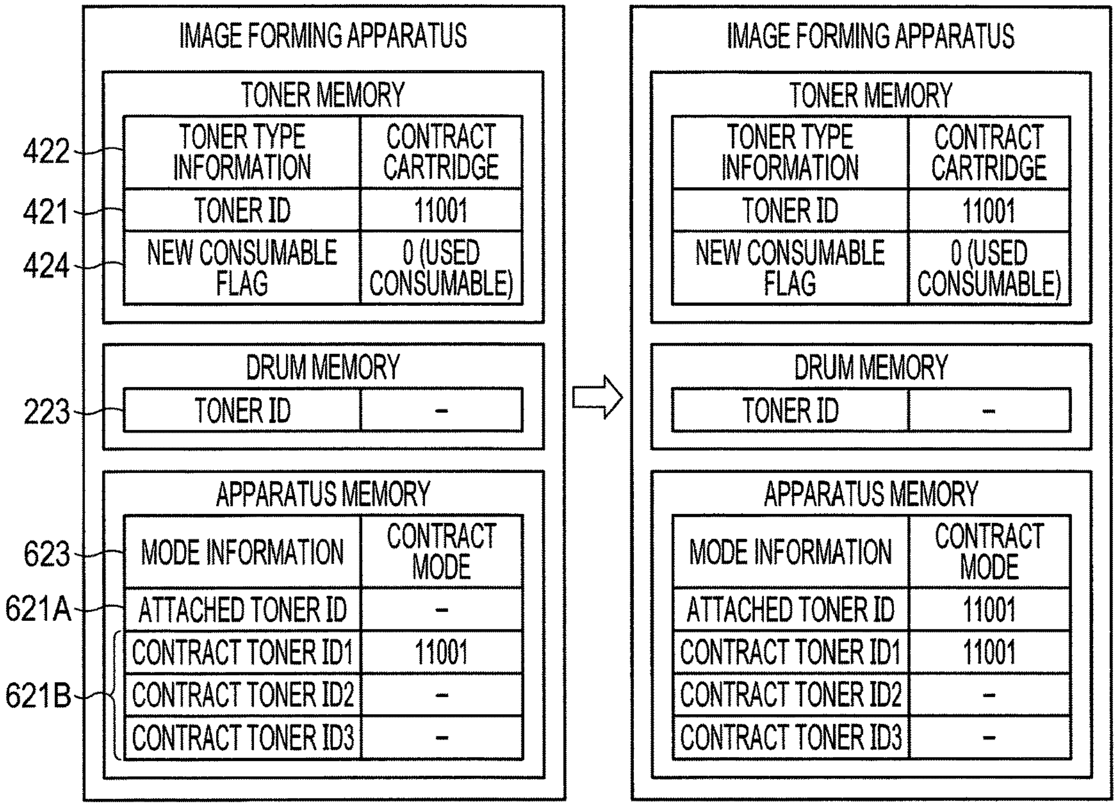

Next, an example of rewriting information in the image forming apparatus 1 depending on the type and status of the toner cartridge 4 will be described. FIGS. 4A and 4B show examples of rewriting information in the image forming apparatus 1 in a case where the toner cartridge 4 attached to the main housing 10 is a normal cartridge. FIG. 5 shows an example of rewriting information in the image forming apparatus 1 in a case where the toner cartridge 4 attached to the main housing 10 is a new contract cartridge. FIGS. 6A and 6B show examples of rewriting information in the image forming apparatus 1 in a case where the toner cartridge 4 attached to the main housing 10 is a used contract cartridge.

In FIGS. 4A to 6B, an example of rewriting information in the image forming apparatus 1 as a contracted apparatus is described. Thus, information indicating a contract mode is stored, as the mode information, in the third area 623 of the apparatus memory 62. No toner ID is stored in the third area 223 of the drum cartridge 20 attached to the main housing 10 together with the toner cartridge 4 and the eleventh area 621A of the apparatus memory 62 before the controller 61 communicates with the toner memory 42.

In the image forming apparatus 1 for which the contract is not made, when a normal cartridge is attached to the main housing 10, the controller 61 permits the use of the toner cartridge 4 regardless of whether the normal cartridge is new or used. When a contract cartridge is attached to the main housing 10, the controller 61 does not permit the use of the toner cartridge.

[When Toner Cartridge 4 is Normal Cartridge]

In FIGS. 4A and 4B, the toner cartridge 4 attached to the main housing 10 is a normal cartridge. Thus, the toner type information stored in the second area 422 of the toner memory 42 is information indicating the normal cartridge. No toner ID is stored in the twelfth area 621B of the apparatus memory 62 before the controller 61 communicates with the toner memory 42.

In FIG. 4A, the new consumable flag stored in the fourth area 424 of the toner memory 42 is "1", that is, information indicating a new consumable. When the toner type information is information indicating the normal cartridge and the new consumable flag indicates "1", the controller 61 rewrites the new consumable flag from "1" to "0", that is, information indicating a used consumable after communication with the toner memory 42 is established. Then, the controller 61 permits the use of the toner cartridge 4 attached to the main housing 10. In a case where the controller 61 permits the use of the toner cartridge 4, the controller 61 reads the toner ID "10001" from the first area 421 of the toner memory 42 and stores the toner ID in the eleventh area 621A of the apparatus memory 62.

In FIG. 4B, the new consumable flag stored in the fourth area 424 of the toner memory 42 indicates "0". Also when the toner type information is information indicating the normal cartridge and the new consumable flag indicates "0", the controller 61 permits the use of the toner cartridge 4 attached to the main housing 10. In a case where the controller 61 permits the use of the toner cartridge 4, the controller 61 reads the toner ID "10001" from the first area 421 of the toner memory 42 and stores the toner ID in the eleventh area 621A of the apparatus memory 62.

As described above, when the toner cartridge 4 attached to the main housing 10 is the normal cartridge, the controller 61 permits the use of the normal cartridge regardless of whether the normal cartridge is a new consumable or a used consumable.

[When Toner Cartridge 4 is New Contract Cartridge]

In FIG. 5, the toner cartridge 4 attached to the main housing 10 is a new contract cartridge. Thus, the toner type information stored in the second area 422 of the toner memory 42 is information indicating the contract cartridge. The new consumable flag stored in the fourth area 424 of the toner memory 42 indicates "1". No toner ID is stored in the twelfth area 621B of the apparatus memory 62 before the controller 61 communicates with the toner memory 42.

As shown in FIG. 5, when the toner type information is information indicating the contract cartridge and the new consumable flag indicates "1", the controller 61 rewrites the new consumable flag from "1" to "0" after communication with the toner memory 42 is established. Then, the controller 61 permits the use of the toner cartridge 4 attached to the main housing 10. In a case where the controller 61 permits the use of the toner cartridge 4, the controller 61 reads the toner ID "11001" from the first area 421 of the toner memory 42, and stores the toner ID in the eleventh area 621A of the apparatus memory 62.

As described above, when the toner cartridge 4 attached to the main housing 10 is a new contract cartridge, the controller 61 permits the use of the toner cartridge 4. Here, in a case where the cartridge is a new contract cartridge, when the controller 61 permits the use of the contract cartridge, the controller 61 stores the toner ID "11001" read from the first area 421 of the toner memory 42 into the twelfth area 621B of the apparatus memory 62. As a result, as described with reference to FIG. 6B, the controller 61 permits the reuse of the new contract cartridge that has been attached once.

[When Toner Cartridge 4 is Used Contract Cartridge]

In FIGS. 6A and 6B, the toner cartridge 4 attached to the main housing 10 is a used contract cartridge. Thus, the toner type information stored in the second area 422 of the toner memory 42 is information indicating the contract cartridge. The new consumable flag stored in the fourth area 424 of the toner memory 42 indicates "0".

When the toner cartridge 4 attached to the main housing 10 is a used contract cartridge, the controller 61 reads the toner ID from the first area 421 of the toner memory 42, and determines whether the toner ID that matches the read toner ID is stored in the twelfth area 621B of the apparatus memory 62. When the toner ID that matches the toner ID stored in the toner memory 42 is stored in the apparatus memory 62, the controller 61 permits the use of the toner cartridge 4. When the toner ID that matches the toner ID stored in the toner memory 42 is not stored in the apparatus memory 62, the controller 61 does not permit the use of the toner cartridge 4.

In FIG. 6A, the toner ID "11001" is not stored in the twelfth area 621B of the apparatus memory 62 before the controller 61 communicates with the toner memory 42. Thus, the controller 61 determines that the toner ID that matches the toner ID "11001" stored in the toner memory 42 is not stored in the apparatus memory 62. Thus, the controller 61 does not permit the use of the toner cartridge 4.

In FIG. 6B, the toner ID "11001" is stored in the twelfth area 621B of the apparatus memory 62 before the controller 61 communicates with the toner memory 42. The controller 61 determines that the toner ID that matches the toner ID "11001" stored in the toner memory 42 is stored in the apparatus memory 62. Thus, the controller 61 permits the use of the toner cartridge 4. When the controller 61 permits the use of the toner cartridge 4, the controller 61 stores the toner ID "11001" read from the toner memory 42 in the eleventh area 621A of the apparatus memory 62.

As described above, in a case where a normal cartridge is attached to the contracted apparatus, even when the toner ID of the attached normal cartridge is not stored in the twelfth area 621B of the apparatus memory 62, the user is allowed to use the normal cartridge in the contracted apparatus. This applies to the case of a new contract cartridge. In a case where a used contract cartridge is attached to the contracted apparatus, unless the toner ID of the attached used contract cartridge is stored in the twelfth area 621B, the user is not allowed to use the used contract cartridge in the contracted apparatus.

When the user uses another image forming apparatus as a contracted apparatus instead of the currently used contracted apparatus, the toner ID of the currently used contract cartridge is not stored in the apparatus memory of another image forming apparatus that is shipped from the manufacturer of the image forming apparatus. In a state where the toner ID of the currently used contract cartridge is not stored in the apparatus memory of another image forming apparatus, even if the user makes a contract for the other image forming apparatus, the user is not allowed to use the currently used contract cartridge in the other image forming apparatus.

The image forming apparatus 1 of the present embodiment is configured such that, when a user uses another contracted apparatus instead of the currently used contracted apparatus due to failure and so on, the user is allowed to use the currently used contract cartridge in another contracted apparatus. An example of the specific control method in the image forming apparatus 1 will be described below.

Hereinafter, the image forming apparatus 1 that the user is currently used is referred to as an old apparatus. The old apparatus has a contract mode in which the user has registered the image forming apparatus 1 as the contracted apparatus and a normal mode in which the user has not registered the image forming apparatus 1 as the contracted apparatus or the contract has been cancelled. Hereinafter, an old apparatus registered as the contracted apparatus is referred to as an old apparatus in the contract mode, and an old apparatus that is not registered as the contracted apparatus or whose contract has been cancelled is referred to as an old apparatus in the normal mode.

The image forming apparatus 1 that is scheduled to be used by the user instead of the old apparatus is referred to as a new apparatus. The new apparatus has a contract mode in which the user has registered the image forming apparatus 1 as the contracted apparatus and a normal mode in which the user has not registered the image forming apparatus 1 as the contracted apparatus or the contract has been cancelled. Hereinafter, a new apparatus registered as the contracted apparatus is referred to as a new apparatus in the contract mode, and a new apparatus that is not registered as the contracted apparatus or whose contract has been cancelled is referred to as a new apparatus in the normal mode.

[Processing Flow of Old Apparatus]

Figure 7:
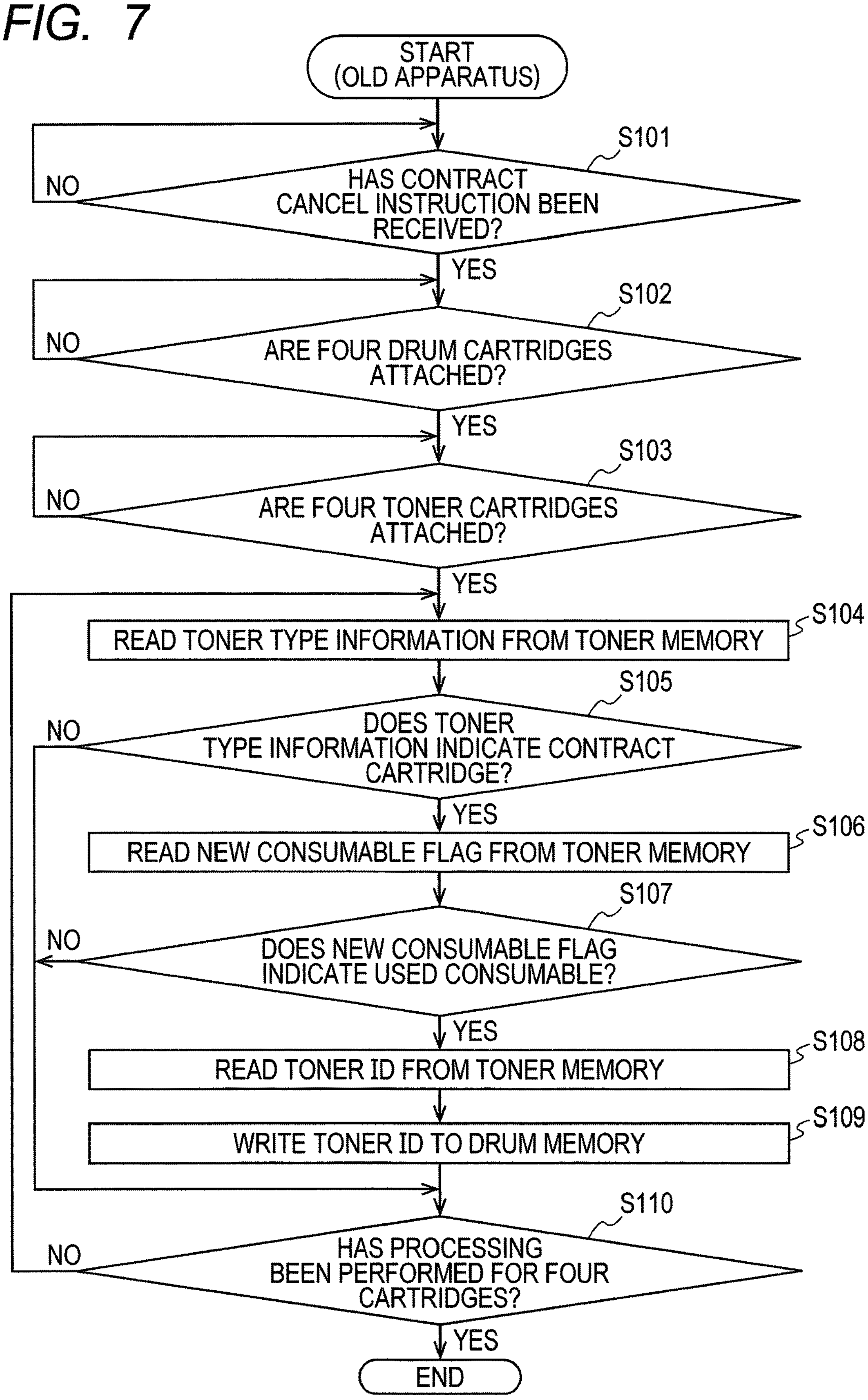
FIG. 7 is a flowchart showing an example of processing executed by an old apparatus.

FIG. 7 shows an example of processing performed by the image forming apparatus 1 as the old apparatus. A series of processes shown in FIG. 7 is started when the controller 61 of the old apparatus in the contract mode receives, from the server 8, a contract cancel instruction that is an instruction for cancelling a contract made for the old apparatus, for example.

In S101, the controller 61 performs a contract determination process of determining whether the contract cancel instruction has been received from the server 8. In response to determining that the contract cancel instruction has been received, the controller 61 rewrites the mode information stored in the toner memory 42 from the information indicating the contract mode to the information indicating the normal mode. As a result, the old apparatus is in the normal mode state. The controller 61 proceeds from YES in S101 to S102. In response to determining that the contract cancel instruction has not been received, that is, in a case of NO in S101, the controller 61 waits for reception of the contract cancel instruction.

In S102, in a state where the old apparatus is in the normal mode, the controller 61 determines whether four drum cartridges 20 are attached to the main housing 10. Based on the fact that the connector 101 is electrically connected with the drum memory 22, the controller 61 determines that four drum cartridges 20 are attached to the main housing 10.

In response to determining that four drum cartridges 20 are attached to the main housing 10, the controller 61 proceeds from YES in S102 to S103. In response to determining that four drum cartridges 20 are not attached to the main housing 10, that is, in a case of NO in S102, the controller 61 waits until four drum cartridges 20 are attached to the main housing 10.

In S103, the controller 61 determines whether four toner cartridges 4 are attached to the main housing 10. Based on the fact that the connector 102 is electrically connected with the toner memory 42, the controller 61 determines that four toner cartridges 4 are attached to the main housing 10.

In response to determining that four toner cartridges 4 are attached to the main housing 10, the controller 61 proceeds from YES in S103 to S104. In response to determining that four toner cartridges 4 are not attached to the main housing 10, that is, in a case of NO in S103, the controller 61 waits until four toner cartridges 4 are attached to the main housing 10.

The controller 61 may perform processing of S102 after processing of S103 or perform processing of S102 in parallel with processing of S103.

The controller 61 performs processing of S104 and thereafter for one toner cartridge 4 selected from the four toner cartridges 4 attached to the main housing 10. The controller 61 performs processing of S104 and thereafter for the drum cartridge 20 to which the selected one toner cartridge 4 is attached.

In S104, the controller 61 reads the toner type information from the toner memory 42. In S105, the controller 61 performs a consumable determination process of determining whether the toner type information read from the toner memory 42 is information indicating the contract cartridge. In response to determining that the toner type information is information indicating the contract cartridge, the controller 61 proceeds from YES in S105 to S106. In response to determining that the toner type information is information indicating the normal cartridge, the controller 61 proceeds from NO in S105 to S110.

In S106, the controller 61 reads the new consumable flag from the toner memory 42. In S107, the controller 61 performs a status determination process of determining whether the new consumable flag read from the toner memory 42 is information indicating a used consumable. In response to determining that the new consumable flag is information indicating a used consumable, the controller 61 proceeds from YES in S107 to S108. In response to determining that the new consumable flag is information indicating a new consumable, the controller 61 proceeds from NO in S107 to S110.

By performing S105 and S107, the controller 61 executes processing of S108 and thereafter for a used contract cartridge. That is, the controller 61 executes processing of S108 and thereafter for the toner cartridge 4 and the drum cartridge 20 that have been used in the old apparatus.

In S108, the controller 61 reads the toner ID from the toner memory 42. In S109, the controller 61 performs a storing process of storing (writing) the toner ID read from the toner memory 42 into the drum memory 22. By executing the storing process, the controller 61 allows both the drum cartridge 20 in which the toner ID has been written and the toner cartridge 4 storing the toner ID written to the drum cartridge 20 to be used in the new apparatus. That is, the controller 61 allows the toner cartridge 4 and the drum cartridge 20 that have been used in the old apparatus to be used in the new apparatus.

In S110, the controller 61 determines whether processing of S104 has been performed for all of four toner cartridges 4. In response to determining that the processing of S104 has been performed for all of four toner cartridges 4, the controller 61 ends the processing shown in FIG. 7.

In response to determining that the processing of S104 has not been performed for all of four toner cartridges 4, the controller 61 proceeds from NO in S110 to S104. That is, the controller 61 selects one toner cartridge 4 from toner cartridges 4 for which the processing of S104 has not been performed and performs the processing of S104.

As described above, in a case where at least the contract of the old apparatus has been cancelled and a contract cartridge is attached to the old apparatus, in S109, the controller 61 writes the toner ID stored in the toner memory 42 to the drum memory 22. The controller 61 allows the toner cartridge 4 to be used in the new apparatus, together with the drum cartridge 20. Thus, only by attaching the toner cartridge 4 and the drum cartridge 20 that have been used in the old apparatus to the new apparatus, the user can use the toner cartridge 4 in the new apparatus. This enables the user to easily perform a transition from the old apparatus to the new apparatus.

Users change contracted apparatuses due to various reasons. Conventionally, a change of the contracted apparatus is completed by the procedures below. For example, first, a new image forming apparatus is delivered to a user. Secondly, a contract is made for the new image forming apparatus. Thirdly, a service provider supplies the user with a contract consumable for the new image forming apparatus based on the contract. That is, the user cannot use a flat-rate printing service by the new image forming apparatus immediately and has to wait for delivery of a contract consumable for the new image forming apparatus, which is inconvenient.

As described above, in the present embodiment, the controller 61 of the old apparatus writes the toner ID stored in the toner memory 42 to the drum memory 22, thereby allowing the toner cartridge 4 to be used in the new apparatus together with the drum cartridge 20. This enables the user to use the toner cartridge 4 that has been used in the old apparatus in the new apparatus without waiting during the above-mentioned period.

When a used contract cartridge is attached to the old apparatus, the controller 61 writes the toner ID stored in the toner memory 42 to the drum memory 22. Thus, the controller 61 of the new apparatus stores the toner ID in the twelfth area 621B of the apparatus memory 62 in order to permit the use of the contract cartridge that has been used by the user in the old apparatus.

[Example of Rewriting Information in Old Apparatus]

Figure 8:
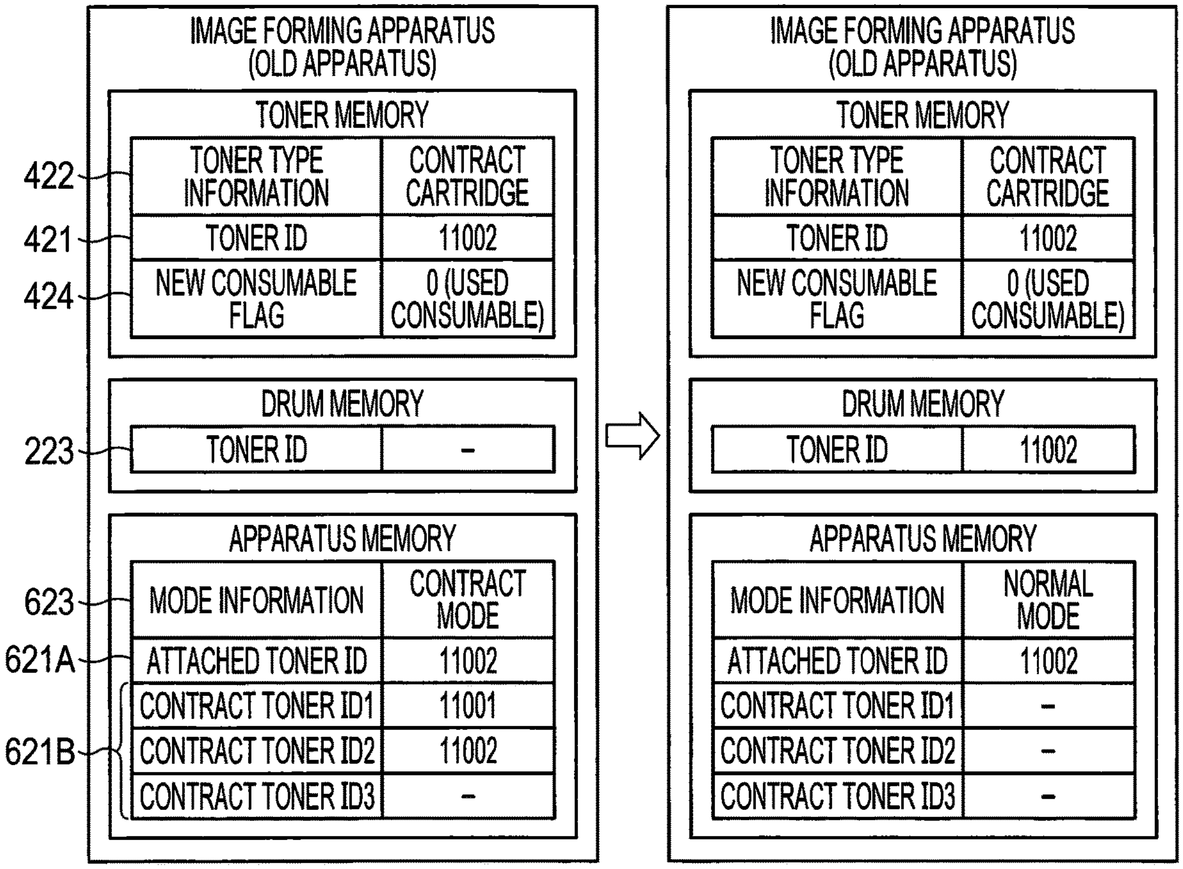
FIG. 8 is a diagram showing an example of rewriting information in the old apparatus.

FIG. 8 shows an example of rewriting information in the old apparatus. In the example of FIG. 8, the old apparatus is a contracted apparatus. Thus, in the third area 623 of the apparatus memory 62, information indicating the contract mode is stored as the mode information. In the example of FIG. 8, the toner ID "11002" of the toner cartridge 4 attached to the old apparatus and permitted to be used in the old apparatus is stored in the eleventh area 621A of the apparatus memory 62 before the controller 61 receives the contract cancel instruction. The toner ID "11002" and the toner ID "11001" are stored in the twelfth area 621B of the apparatus memory 62. The toner ID "11001" is a toner ID of the toner cartridge 4 that was permitted to be used in the old apparatus in the past.

In the example of FIG. 8, the toner type information of the toner cartridge 4 attached to the old apparatus is information indicating the contract cartridge. Thus, the controller 61 proceeds from YES in S105 to S106 in FIG. 7. The new consumable flag of the toner cartridge attached to the old apparatus is information indicating a used consumable. Thus, the controller 61 proceeds from YES in S107 to S108 in FIG. 7.

Thus, in the example of FIG. 8, the controller 61 performs the processing of S108 and S109 in FIG. 7, thereby storing the toner ID read from the first area 421 of the toner memory 42 in the third area 223 of the drum memory 22. The controller 61 rewrites the mode information of the apparatus memory 62 from information indicating the contract mode to information indicating the normal mode, and deletes the toner IDs stored in the twelfth area 621B of the apparatus memory 62.

[Processing Flow of New Apparatus]

Next, an example of processing performed by the image forming apparatus 1 as the new apparatus will be described. Specifically, an example of the processing flow will be described in which the image forming apparatus 1 as the new apparatus in the contract mode writes the toner ID stored in the drum memory 22 to the apparatus memory 62. Further, an example of processing an example of the processing flow will be described in which it is determined whether the use of the toner cartridge 4 is permitted.

[Processing Example when Toner ID is Written in Apparatus Memory]

Figure 9:
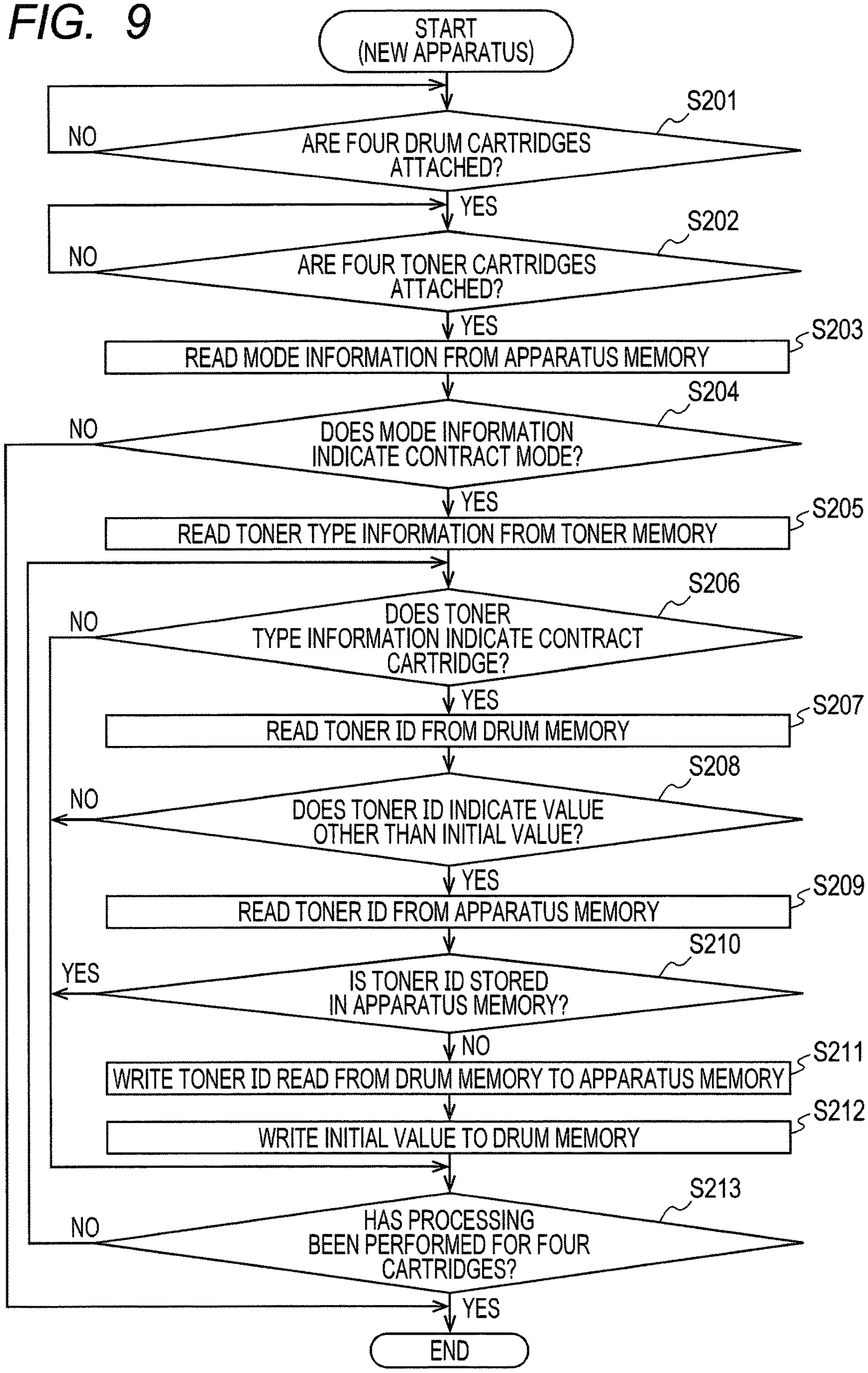
FIG. 9 is a flowchart showing an example of processing executed by a new apparatus when storing a toner ID stored in a drum memory in an apparatus memory.

FIG. 9 shows an example of processing performed by the new apparatus and is an example of processing in which the toner ID stored in the drum memory 22 is written to the apparatus memory 62. FIG. 9 is processing in which, when a new apparatus is shipped to the user to replace the old apparatus, the new apparatus permits the use of the contract cartridge that has been used in the old apparatus, for example.

When the user uses the new apparatus as the contracted apparatus, the user terminal 9 transmits, to the server 8, a request for making a contract for the new apparatus. In response to receiving, from the server 8, a transition instruction from the normal mode to the contract mode, the controller 61 rewrites the mode information of the apparatus memory 62 from information indicating the normal mode to information indicating the contract mode.

In S201, in a state where the new apparatus is in the contract mode, as similar to S102 of FIG. 7, the controller 61 determines whether four drum cartridges 20 are attached to the main housing 10. In S202, as similar to S103 of FIG. 7, the controller 61 determines whether four toner cartridges 4 are attached to the main housing 10.

The controller 61 performs processing of S203 and thereafter for one toner cartridge 4 selected from four toner cartridges 4 attached to the main housing 10. The controller 61 performs processing of S203 and thereafter for the drum cartridge 20 to which the selected one toner cartridge 4 is attached.

In S203, the controller 61 reads the mode information from the apparatus memory 62. In S204, the controller 61 determines whether the mode information read from the apparatus memory 62 is information indicating the contract mode. That is, the controller 61 performs a contract determination process of determining whether a contract has been made for the new apparatus. In response to determining that the mode information is information indicating the contract mode, the controller 61 proceeds from YES in S204 to S205.

In response to determining that the mode information is information indicating the normal mode, that is, in a case of NO in S204, the controller 61 ends the processing shown in FIG. 9. The processing shown in FIG. 9 is performed for permitting the use of the contract cartridge used by the user in the old apparatus. Thus, in a case where the new apparatus is not the contracted apparatus, the controller 61 does not perform the processing of S205 and thereafter.

In S205, the controller 61 reads the toner type information from the toner memory 42. In S206, the controller 61 performs a consumable determination process of determining whether the toner type information read from the toner memory 42 is information indicating the contract cartridge. In response to determining that the toner type information is information indicating the contract cartridge, the controller 61 proceeds from YES in S206 to S207.

In response to determining that the toner type information is information indicating the normal cartridge, the controller 61 proceeds from NO in S206 to S213. When a normal cartridge is attached to the main housing 10, the controller 61 permits the use of the normal cartridge without referring to the twelfth area 621B of the apparatus memory 62 regardless of whether the normal cartridge is a new consumable or a used consumable. Thus, the controller 61 does not perform the processing of S207 and thereafter and performs processing of S213.

In S207, the controller 61 reads the toner ID from the drum memory 22. In S208, the controller 61 determines whether the toner ID read from the drum memory 22 indicates a value other than an initial value. That is, the controller 61 performs a first determination process of determining whether the drum memory 22 stores the toner ID of the toner cartridge 4 that is attached to the main housing 10 together with the drum cartridge 20.

When the drum cartridge 20 is shipped, the third area 223 of the drum memory 22 may store, as the initial value of the toner ID, a value that is not used as a value of the toner ID of the manufactured toner cartridge 4. Thus, unless the toner ID stored in the toner memory 42 is written to the third area 223, the toner ID stored in the third area 223 represents the initial value.

As shown in FIG. 7, when the contract is cancelled for the old apparatus, in S109, the controller 61 of the old apparatus writes the toner ID stored in the toner memory 42 to the drum memory 22. That is, the controller 61 of the old apparatus rewrites the initial value of the toner ID stored in the third area 223 to the toner ID stored in the toner memory 42. Thus, the controller 61 of the new apparatus performs the processing of S208, thereby performing the processing of S209 and thereafter for the toner cartridge 4 and the drum cartridge 20 that have been used in the old apparatus.

In S209, the controller 61 reads the toner ID from the apparatus memory 62. In S210, the controller 61 performs a third determination process of determining whether the toner ID as described below is stored in the apparatus memory 62.

Toner ID as an example of first identification information for identifying the toner cartridge 4 attached to the main housing 10.

Toner ID as an example of second identification information for identifying another toner cartridge 4 different from the toner cartridge 4 attached to the main housing 10.

When the toner ID is not stored in the twelfth area 621B of the apparatus memory 62, for example, when the toner ID read from the twelfth area 621B represents the initial value, the controller 61 determines that there is no use history of the contract cartridge in the new apparatus by the third determination process. When the first area 621 of the apparatus memory 62 is configured to store the toner ID of the normal cartridge, the controller 61 may determine whether the toner ID of the normal cartridge is stored. When the toner ID of the normal cartridge is not stored, the controller 61 also determines that there is no use history of the normal cartridge in the new apparatus by the third determination process.

In response to determining that the toner ID is not stored in the apparatus memory 62, the controller 61 proceeds from NO in S210 to S211. In response to determining that the toner ID is stored in the apparatus memory 62, the controller 61 proceeds from YES in S210 to S213.

In S211, the controller 61 performs a storing process of storing (writing) the toner ID read from the drum memory 22 in S207 in the apparatus memory 62.

When the toner ID of the used contract cartridge attached to the main housing 10 matches the toner ID stored in the twelfth area 621B of the apparatus memory 62, the controller 61 permits the use of the used contract cartridge. By performing the storing process, the controller 61 permits the use of the contract cartridge that has been used in the old apparatus. This enables the user to use the toner cartridge 4 in the new apparatus only by attaching the toner cartridge 4 and the drum cartridge 20 that have been used in the old apparatus to the new apparatus. This enables the user to easily perform a transition from the old apparatus to the new apparatus.

In a case of NO in S210, the controller 61 performs the storing process to permit the use of the toner cartridge 4 attached to the main housing 10. In other words, when there is use history of the toner cartridge 4 in the apparatus memory 62, the controller 61 does not perform the storing process. Thus, the controller 61 permits the use of the toner cartridge 4 that has been used in the old apparatus only in the new apparatus with no use history of the toner cartridge in the apparatus memory 62, that is, the new apparatus shipped as a replacement of the old apparatus.

In S212, the controller 61 performs a deletion process of deleting the toner ID stored in the drum memory 22. The controller 61 may perform the deletion process by rewriting the toner ID stored in the drum memory 22 to the initial value. If the controller 61 performs the deletion process, an image forming apparatus different from the new apparatus cannot read, from the drum memory 22, the toner ID of the toner cartridge 4 attached together with the drum cartridge 20 and store the toner ID in the apparatus memory 62. This reduces a possibility that the toner cartridge 4 and the drum cartridge 20 that have been used in the old apparatus are used in the image forming apparatus different from the new apparatus.

For example, it is assumed that, when the controller 61 of the old apparatus receives a contract cancel instruction, the controller 61 of the old apparatus does not rewrite the mode information stored in the toner memory 42 to information indicating the normal mode due to some failure. In this case, the controller 61 of the old apparatus does not delete the toner ID stored in the twelfth area 621B of the apparatus memory 62.

It is assumed that the user attaches the drum cartridge 20 to the old apparatus again before attaching the drum cartridge 20 to the new apparatus. When the controller 61 of the old apparatus does not perform the processing of S210 when performing the processing of FIG. 9, the controller 61 of the old apparatus deletes the toner ID stored in the drum memory 22 although the toner ID is stored in the twelfth area 621B. After that, even if the user attaches the drum cartridge 20 to the new apparatus, the controller 61 of the new apparatus cannot store, in the apparatus memory 62, the toner ID of the toner cartridge 4 attached to the new apparatus together with the drum cartridge 20. Thus, the controller 61 of the new apparatus does not permit the use of the toner cartridge 4 that has been used in the old apparatus.

As described above, in response to determining in S210 that the apparatus memory 62 stores the toner ID of the toner cartridge 4 that has been attached to the main housing 10, the controller 61 does not perform storing process of S211. Thus, in a case where the contract for the old apparatus has not been appropriately cancelled and the drum cartridge 20 is attached to the old apparatus again, the possibility that the controller 61 of the old apparatus executes the deletion process is reduced. Thus, even when the contract for the old apparatus has not been appropriately cancelled and the drum cartridge 20 is attached to the old apparatus again, the controller 61 of the new apparatus permits the use of the toner cartridge 4 that has been used in the old apparatus.

In S213, the controller 61 determines whether the processing of S206 has been performed for all of four toner cartridges 4. In response to determining that the processing of S206 has been performed for all of four toner cartridges 4, the controller 61 ends the processing shown in FIG. 9.

In response to determining that the processing of S206 has not been performed for all of four toner cartridges 4, the controller 61 proceeds from NO in S213 to S206. That is, the controller 61 selects one toner cartridge from the toner cartridges 4 for which the processing of S206 has not been performed and performs the processing of S206.

[Processing Example of Determining Whether Use of Toner Cartridge is Permitted]

Figure 10:
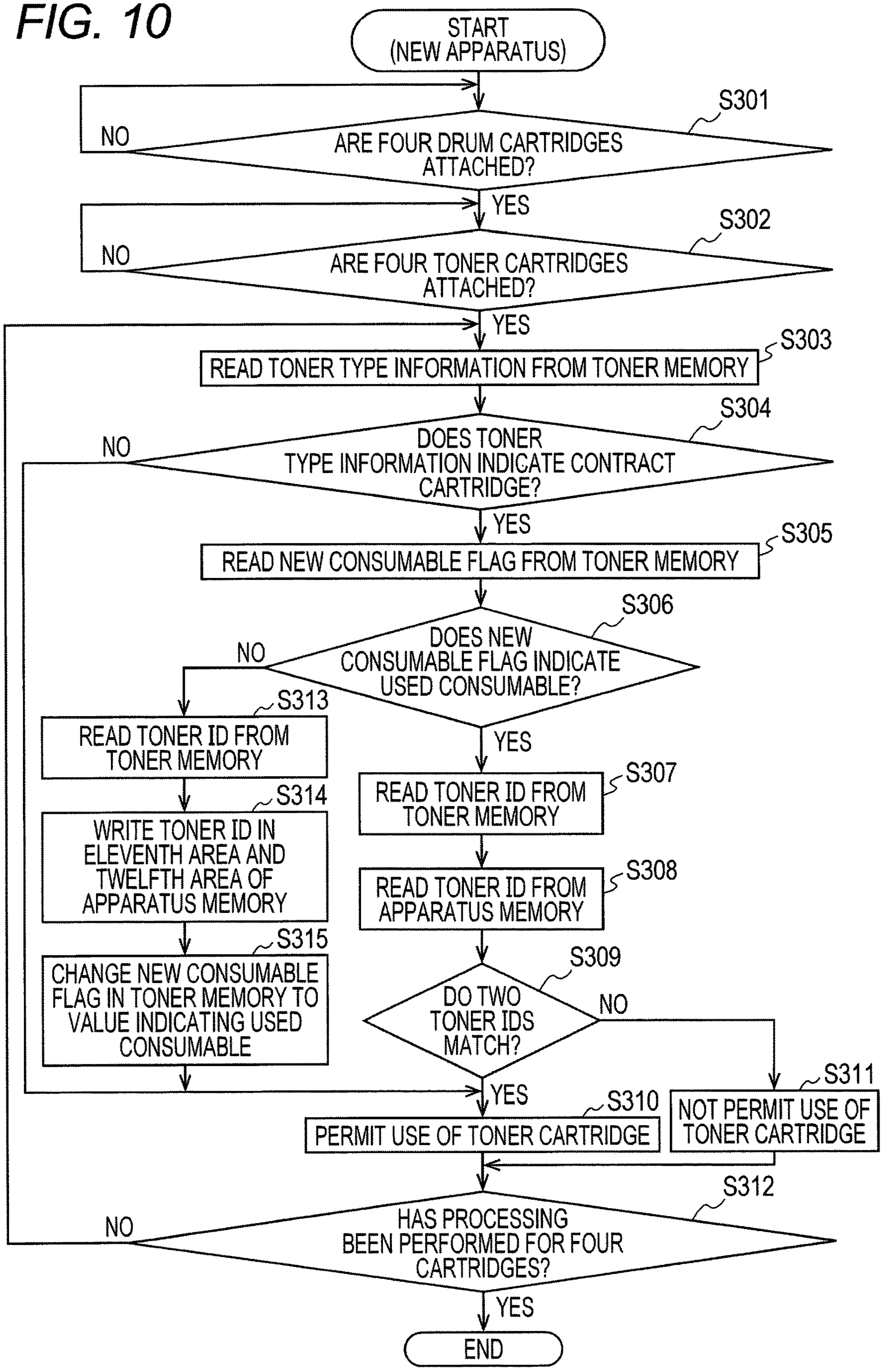
FIG. 10 is a flowchart showing an example of processing executed by the new apparatus when determining whether a toner cartridge attached to a main housing is usable.

FIG. 10 shows an example of processing performed by the new apparatus and an example of processing for determining whether the use of the toner cartridge 4 attached to the main housing 10 is permitted.

In S301, in a state where the new apparatus is in the contract mode, as similar to S102 of FIG. 7, the controller 61 determines whether four drum cartridges 20 are attached to the main housing 10. In S302, as similar to S103 of FIG. 7, the controller 61 determines whether four toner cartridges 4 are attached to the main housing 10.

The controller 61 performs processing of S303 and thereafter for one toner cartridge 4 selected from four the toner cartridges 4 attached to the main housing 10. The controller 61 performs processing of S303 and thereafter for the drum cartridge 20 to which the selected one toner cartridge 4 is attached.

In S303, the controller 61 reads the toner type information from the toner memory 42. In S304, the controller 61 determines whether the toner type information read from the toner memory 42 is information indicating the contract cartridge. In response to determining that the toner type information is information indicating the contract cartridge, the controller 61 proceeds from YES in S304 to S305. In response to determining that the toner type information is information indicating the normal cartridge, the controller 61 proceeds from NO in S304 to S310.

In S305, the controller 61 reads the new consumable flag from the toner memory 42. In S306, the controller 61 determines whether the new consumable flag read from the toner memory 42 is information indicating a used consumable. In response to determining that the new consumable flag is information indicating a used consumable, the controller 61 proceeds from YES in S306 to S307.

In S307, the controller 61 reads the toner ID from the toner memory 42. In S308, the controller 61 reads the toner ID from the twelfth area 621B of the apparatus memory 62. In S309, the controller 61 performs a second determination process of determining whether the toner ID read in S307 and the toner ID read in S308 match.

In response to determining that there is a toner ID in toner IDs read in S308 that matches the toner ID read in S307, the controller 61 proceeds from YES in S309 to S310. In response to determining that there is no toner ID in toner IDs read in S308 that matches the toner ID read in S307, the controller 61 proceeds from NO in S309 to S311.

In S310, the controller 61 performs a permission process of permitting the use of the toner cartridge 4 in the new apparatus together with the drum cartridge attached to the main housing 10. In a case where there is a toner ID in the toner IDs read in S308 that matches the toner ID read in S307, the controller 61 has performed the storing process of S211 in FIG. 9. In S311, the controller 61 does not permit the use of the toner cartridge 4 in the new apparatus together with the drum cartridge 20 attached to the main housing 10.

In S312, the controller 61 determines whether the processing of S303 has been performed for all of four toner cartridges 4. In response to determining that the processing of S303 has been performed for all of four toner cartridges 4, the controller 61 ends the processing shown in FIG. 10.

In response to determining that the processing of S303 has not been performed for all of four toner cartridges 4, the controller 61 proceeds from NO in S312 to S303. That is, the controller 61 selects one toner cartridge from toner cartridges 4 for which the processing of S303 has not been performed and performs processing of S303.

In response to determining in S306 that the new consumable flag is information indicating a new consumable, the controller 61 proceeds from NO in S306 to S313.

In S313, the controller 61 reads the toner ID from the toner memory 42. In S314, the controller 61 writes the toner ID read in S313 in the eleventh area 621A and the twelfth area 621B of the apparatus memory 62. In S315, the controller 61 rewrites (changes) the new consumable flag of the toner memory 42 from information indicating a new consumable to information indicating a used consumable. After the processing of S315, the controller 61 proceeds to S310. Alternatively, the controller 61 may perform the processing of S313 and S314 after the processing of S315. In this case, the controller 61 proceeds to S310 after the processing of S314.

As described above, when the new apparatus is the contracted apparatus, the controller 61 stores the toner ID of the contract cartridge in the twelfth area 621B of the apparatus memory 62, the toner ID being stored in the drum memory 22 of the drum cartridge 20 attached with the contract cartridge. Thus, in S310, the controller 61 permits the use of the contract cartridge that the user has used in the old apparatus. This allows the user to use the toner cartridge 4 that has been used in the old apparatus in the new apparatus only by attaching the toner cartridge 4 and the drum cartridge 20 that have been used in the old apparatus to the new apparatus. This allows the user to easily perform a transition from the old apparatus to the new apparatus. This allows the user to use the toner cartridge 4 that has been used in the old apparatus in the new apparatus without waiting during the period from when the user purchases the new apparatus until a contract consumable is delivered to the user.

In a case of YES in S309, the controller 61 proceeds to S310. In S211 in FIG. 9, the controller 61 writes the toner ID of the contract cartridge that has been used in the old apparatus to the apparatus memory 62 of the new apparatus that has been shipped as a replacement for the old apparatus. Thus, in the apparatus memory 62 of the new apparatus, only the toner ID of the contract cartridge that has been used in the old apparatus is stored. This reduces a possibility that a contract cartridge different from the contract cartridge that has been used in the old apparatus is used by the new apparatus.

[Example of Rewriting Information in New Apparatus]

Figure 11:
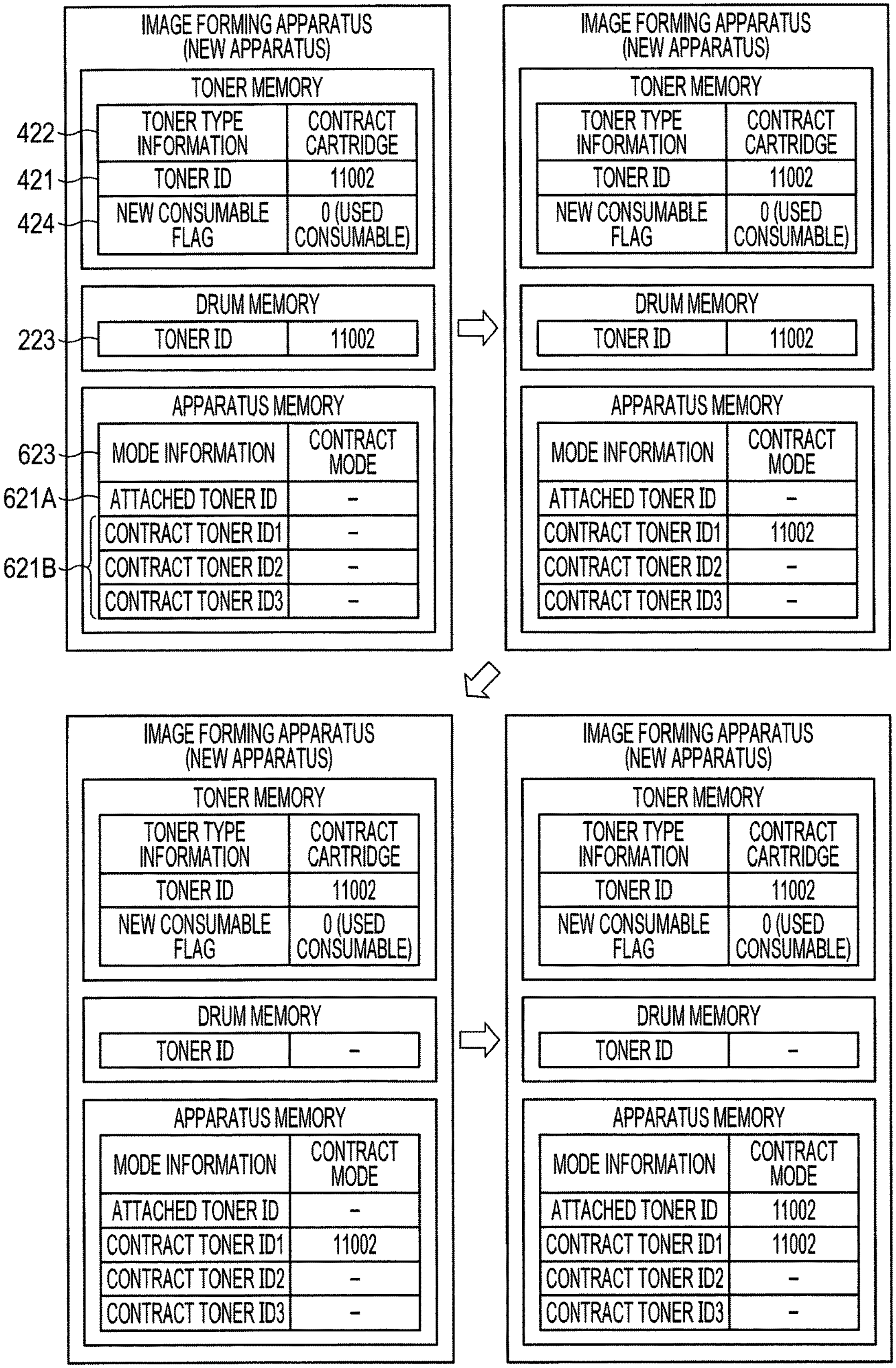
FIG. 11 is a diagram showing an example of rewriting information in the new apparatus.

FIG. 11 shows an example of rewriting information in the new apparatus. In the example of FIG. 11, the new apparatus is the contracted apparatus. Thus, in the third area 623 of the apparatus memory 62, information indicating the contract mode is stored as the mode information. In the example of FIG. 11, before the controller 61 communicates with the toner memory 42 and the drum memory 22, no toner ID is stored in the eleventh area 621A and the twelfth area 621B of the apparatus memory 62 (see the upper-left diagram of FIG. 11).

In the example of FIG. 11, the toner type information of the toner cartridge 4 attached to the new apparatus is information indicating the contract cartridge. Thus, the controller 61 proceeds from YES in S206 of FIGS. 9 to S207. In the third area 223 of the drum memory 22, the toner ID "11002" stored by the old apparatus (the toner ID of the toner cartridge 4 attached to the new apparatus) is stored. Thus, the controller 61 proceeds from YES in S208 of FIGS. 9 to S209.

As described above, no toner ID is stored in the twelfth area 621B. Thus, the controller 61 proceeds from NO in S210 to S211 of FIG. 9, and writes the toner ID "11002"

stored in the third area 223 to the twelfth area 621B (see the upper-right diagram of FIG. 11). Thereafter, the controller 61 proceeds from S211 to S212 of FIG. 9, and deletes the toner ID "11002" stored in the third area 223 (see the lower-left diagram of FIG. 11).

In the example of FIG. 11, since the toner type information is information indicating the contract cartridge, the controller 61 proceeds from YES in S304 to S305 of FIG. 10. Since the new consumable flag is information indicating a used consumable, the controller 61 proceeds from YES in S306 to S307 of FIG. 10.

As described above, when the controller 61 has performed the processing of FIG. 9, the toner ID "11002" is stored in the twelfth area 621B. Thus, the controller 61 proceeds from YES in S309 to S310 of FIG. 10 and permits the use of the toner cartridge 4 attached to the new apparatus. Thus, as shown in FIG. 11, the controller 61 stores the toner ID "11002" read from the toner memory 42 in the eleventh area 621A (see the lower-right diagram of FIG. 11).

According to one aspect, in a case where the contract for the old apparatus is canceled and the consumable (for example, the toner cartridge 4) is a contract consumable, the controller of the old apparatus writes the identification information of the consumable to the second memory. By writing the identification information to the second memory, the controller of the old device allows the consumable to be used in the new apparatus together with the replacement part (for example, the drum cartridge 20).

Thus, when the user attaches the consumable and the replacement part used in the old apparatus to the new apparatus, the new apparatus permits a use of the consumable based on the identification information stored in the second memory. This allows the user to use the consumable in the new apparatus by simply attaching the consumable and the replacement part used in the old apparatus to the new apparatus. This enables an easy transition from the old apparatus to the new apparatus.

According to another aspect, in a case where the consumable is a used contract consumable, the new apparatus permits the use of the consumable only when the identification information of the consumable is stored in the apparatus memory. Because the controller of the old apparatus stores the identification information of the consumable in the second memory when the consumable is a used contract consumable, the new apparatus stores the identification information in the apparatus memory in order to permit the use of the consumable.

According to another aspect, in a case where a contract is made for the new apparatus and the second memory of the replacement part attached to the new apparatus together with the contract consumable stores the first identification information of the consumable, the controller of the new apparatus stores the first identification information in the apparatus memory. The controller of the new apparatus then permits the use of the consumable attached to the new apparatus. That is, when the user attaches the consumable and the replacement part having been used in the old apparatus to the new apparatus, the controller of the new apparatus permits the use of the consumable based on the first identification information stored in the apparatus memory. Thus, the user can use the consumable in the new apparatus by simply attaching the consumable and the replacement part having been used in the old apparatus to the new apparatus. This enables an easy transition from the old apparatus to the new apparatus. This enables an easy transition for the user from the old apparatus to the new apparatus.

According to another aspect, when the first identification information stored in the first memory and the first identification information stored in the apparatus memory by the storage process match, the controller of the new apparatus permits the use of consumable attached to the new apparatus. This reduces a possibility that a consumable different from the consumable attached to the new apparatus is used by the new apparatus.

According to another aspect, the controller of the new apparatus executes the deleting (erasing) process. Thus, even if the consumable and the replacement part are attached to another image forming apparatus different from the new apparatus, the other image forming apparatus cannot store the first identification information from the second memory to the apparatus memory. This reduces a possibility that the consumable and the replacement part having been used in the old apparatus will be used in an apparatus other than the new apparatus.

According to another aspect, in a case where the apparatus memory does not store the first identification information or the second identification information, the controller of the new apparatus stores, in the apparatus memory, the first identification information of the consumable attached to the new apparatus, thereby permitting the use of consumable. Thus, the consumable having been used in the old apparatus can be used only in the new apparatus shipped from the manufacturer of the image forming apparatus to the user.

According to another aspect, the controller of the old apparatus stores the identification information of the toner cartridge in the second memory of the drum cartridge, thereby allowing the controller of the new apparatus to permit the use of the toner cartridge. Further, the controller of the new apparatus writes the identification information of the toner cartridge stored in the second memory of the drum cartridge to the apparatus memory, thereby permitting the use of the toner cartridge. The identification information of the toner cartridge may be referred to as first identification information.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Various Modifications

Modification 1

The replacement part used together with the toner cartridge 4 as the consumable in the image forming apparatus 1 may be a replacement part other than the drum cartridge 20. The replacement part may be the transfer belt 70, for example. In this case, the second memory that stores the toner ID may be a transfer memory provided at the transfer belt.

Modification 2

The four toner cartridges 4 may be attached to a common drum cartridge 20. In this case, the cartridge holding portion 13 may have a shape configured to hold one drum cartridge 20. The drum memory 22 may store a toner ID for each toner cartridge 4.

Modification 3

The drum cartridge 20 may include a development roller 41 in addition to the photosensitive drum 21, the cartridge housing, the drum memory 22, and a charger. In the cartridge housing, the photosensitive drum 21, the drum memory 22, the charger, and the development roller 41 are provided. The toner cartridge 4 includes the cartridge housing and the toner memory 42 but does not have the development roller 41. The cartridge housing contains the toner. An outer peripheral surface of the development roller 41 is in contact with an outer peripheral surface of the photosensitive drum 21 inside the drum cartridge 20.

Modification 4

The toner cartridge 4 may be constituted by two cartridges (not shown). A first cartridge of the two cartridges constituting the toner cartridge 4 includes the development roller 41. A second cartridge of the two cartridges constituting the toner cartridge 4 includes the cartridge housing and the toner memory 42. The cartridge housing contains the toner.

Modification 5

The image forming apparatus 1 may include one cartridge (not shown) instead of the drum cartridge 20 and the toner cartridge 4. The one cartridge includes the photosensitive drum 21, the cartridge housing, the memory, the charger, and the development roller 41. The outer peripheral surface of the development roller 41 is in contact with the outer peripheral surface of the photosensitive drum 21 inside the one cartridge. The cartridge housing of the one cartridge contains the toner.

Modification 6

In the image forming apparatus 1, the drum cartridge 20 and the toner cartridge 4 may be detachably attached mutually independently of each other with respect to the main housing 10.

Modification 7

The image forming apparatus 1 may be an MFP (Multifunction Printer or Multifunction Peripheral) also including other functions as a scanner or a facsimile. Even when the image forming apparatus 1 is an MFP, the image forming apparatus 1 may execute the various types of processing described in the above-described embodiment similarly to the image forming apparatus 1 of the above-described embodiment. The image forming apparatus 1 of this modification has effects similar to those of the image forming apparatus 1 of the above-described embodiment.

Modification 8

Print base material (print medium) of the image forming apparatus 1 is not limited to paper. For example, the print base material may be a tape. In a case where the print base material is a tape, a tape cassette which supplies a tape is attached to the image forming apparatus 1. The image forming apparatus 1 performs printing on the tape conveyed from the tape cassette. In this case, the image forming apparatus 1 may be a laser printer or an inkjet printer.

Modification 9

The image forming apparatus 1 may be an inkjet printer. In a case where the image forming apparatus 1 is the inkjet printer, not the drum cartridge 20 or the toner cartridge 4 described in the embodiments but an ink cartridge is attached to the cartridge holding portion 13 of the image forming apparatus 1. The number of ink cartridges attached to the image forming apparatus 1 is not particularly limited. For example, in the image forming apparatus 1, four ink cartridges in total corresponding to each of four colors of cyan, magenta, yellow, and black may be attached or only a cartridge corresponding to one color of black may be attached.

The ink cartridge includes a cartridge housing filled with ink which is consumable material, and an ink memory that stores ink cartridge information. The ink cartridge information may include, for example, an ink ID, ink type information, ink remaining amount information, and a new consumable flag.

The ink ID is identification information of the ink cartridge and is information included in the ink cartridge information instead of the toner ID in the above-described embodiment. The ink type information is information indicating a type of the ink cartridge and is information included in the ink cartridge information instead of the toner type information in the above-described embodiment. The ink remaining amount information is information indicating a remaining amount of the ink in the ink cartridge and is information included in the ink cartridge information instead of the toner remaining amount information in the above-described embodiment. The new consumable flag is information corresponding to information of the same name in the information related to the toner cartridge 4 in the above-described embodiment, in which the "toner" in the information related to the toner cartridge 4 is replaced with the "ink" and the "toner cartridge" with the "ink cartridge".

In the cartridge housing of the ink cartridge, an agitator for agitating the ink may be provided. The agitator operates in accordance with an instruction from the controller 61 in a state where the ink cartridge is attached to the image forming apparatus 1.

In a case where the image forming apparatus 1 is an ink jet printer, a replacement part used in the image forming apparatus 1 together with an ink cartridge as a consumable corresponds to the drum cartridge 20. In this case, the replacement part includes a memory instead of the drum memory 22, and the memory stores, for example, identification information of the replacement part and life information of the replacement part. In this modification, the memory includes an area for storing the ink ID, the area corresponding to the third area 223 of the drum memory 22.

In a case where the image forming apparatus 1 is an inkjet printer, a flow of each processing illustrated in each flowchart described in the above-described embodiment is the same. Specifically, when the image forming apparatus 1 is an inkjet printer, the "toner cartridge 4" and the "toner memory 42" of the above-described embodiment may be read as an ink cartridge and an ink memory, respectively. Similarly, the "drum cartridge 20" and the "drum memory 22" of the above-described embodiment may be read as a replacement part and a memory, respectively. Various types of information included in the information related to the toner cartridge 4 in the above-described embodiment may be read as corresponding information in the ink cartridge information. The image forming apparatus 1 of this modification has effects similar to those of the image forming apparatus 1 of the above-described embodiment.

[Example of Implementation by Software]

The functions of the image forming apparatus 1 (hereinafter referred to as "apparatus") may be realized by a program for causing a computer to function as the image forming apparatus 1, the program for operating the computer as the controller 61 of the image forming apparatus 1.

In this case, the image forming apparatus 1 includes a computer having at least one controller (for example, processor) and at least one storage device (for example, memory) as hardware for executing the above program. By executing the above program using the controller and the storage device, each function described in each of the above embodiments is realized.

The program may be recorded on one or more non-transitory computer-readable recording medium. This recording medium may or may not be included in the image forming apparatus 1. In the latter case, the program may be supplied to the image forming apparatus 1 via any wired or wireless transmission medium.

Also, part or all of the functions of the controller 61 may be realized by a logic circuit. For example, an integrated circuit in which logic circuits functioning as the above control blocks are formed is also included in the scope of the present disclosure.

What is claimed is:

1. An image forming apparatus comprising:

a main housing;

a consumable attachable to the main housing, the consumable including a first memory, the first memory storing type information and identification information, the type information indicating whether the consumable is a contract consumable or a normal consumable, the contract consumable being a consumable that is usable when a contract for the image forming apparatus is made, the normal consumable being a consumable that is usable regardless of whether the contract is made, the identification information is unique information for identifying the consumable;

a replacement part used in the image forming apparatus together with the consumable, the replacement part including a second memory; and a controller configured to:

determine whether a contract cancel instruction has been received, the contract cancel instruction being an instruction for cancelling the contract for the image forming apparatus;

in response to determining that the contract cancel instruction has been received, determine whether the type information is information indicating the contract consumable; and in response to determining that the type information is information indicating the contract consumable, store the identification information in the second memory, thereby allowing a use of the consumable in another image forming apparatus together with the replacement part.

2. The image forming apparatus according to claim 1, wherein the first memory stores status information indicating whether the consumable is a new consumable or a used consumable; and wherein the controller is configured to:

in response to determining that the type information is information indicating the contract consumable, determine whether the status information is information indicating the used consumable; and in response to determining that the status information is information indicating the used consumable, store the identification information in the second memory.

3. The image forming apparatus according to claim 1, wherein the consumable is a toner cartridge configured to contain toner; and wherein the replacement part is a drum cartridge including a photosensitive drum.

4. An image forming apparatus comprising:

a main housing;

an apparatus memory;

a consumable attachable to the main housing, the consumable including a first memory, the first memory storing type information and first identification information, the type information indicating whether the consumable is a contract consumable or a normal consumable, the contract consumable being a consumable that is usable when a contract for the image forming apparatus is made, the normal consumable being a consumable that is usable regardless of whether the contract is made, the first identification information is unique information for identifying the consumable;

a replacement part used in the image forming apparatus together with the consumable, the replacement part including a second memory; and a controller configured to:

determine whether the image forming apparatus is in a state where the contract is made;

determine whether the type information is information indicating the contract consumable;

in response to determining that the image forming apparatus is in a state where the contract is made and determining that the type information is information indicating the contract consumable, determine whether the second memory stores the first identification information;

in response to determining that the second memory stores the first identification information, write the first identification information stored in the second memory to the apparatus memory; and after writing the first identification information stored in the second memory to the apparatus memory, permit a use of the consumable in the image forming apparatus together with the replacement part.

5. The image forming apparatus according to claim 4, wherein the controller is configured to:

determine whether the first identification information stored in the first memory and the first identification information stored in the apparatus memory match; and in response to determining that the first identification information stored in the first memory and the first identification information stored in the apparatus memory match, permit the use of the consumable in the image forming apparatus together with the replacement part.

6. The image forming apparatus according to claim 4, wherein the controller is configured to:

in a case where the first identification information is stored in the apparatus memory, delete the first identification information from the second memory.

7. The image forming apparatus according to claim 4, wherein the controller is configured to:

determine whether the apparatus memory stores the first identification information or second identification information, the second identification information identifying another consumable different from the consumable; and in response to determining that the apparatus memory does not store the first identification information or the second identification information, write the first identification information stored in the second memory to the apparatus memory.

8. The image forming apparatus according to claim 4, wherein the consumable is a toner cartridge configured to contain toner; and wherein the replacement part is a drum cartridge including a photosensitive drum.

9. The image forming apparatus according to claim 4, wherein the apparatus memory includes a particular area configured to store, as attached consumable identification information, consumable identification information of a consumable that is attached to the image forming apparatus and that is allowed to be used in the image forming apparatus; and wherein permitting the use of the consumable in the image forming apparatus includes storing the first identification information in the particular area of the apparatus memory.

10. A control method of controlling an image forming apparatus, the control method comprising:

determining whether a contract cancel instruction has been received, the contract cancel instruction being an instruction for cancelling a contract for the image forming apparatus;

in response to determining that the contract cancel instruction has been received, determining whether type information is information indicating a contract consumable, the type information being stored in a first memory of a consumable attached to the image forming apparatus, the type information indicating whether the consumable is the contract consumable or a normal consumable, the contract consumable being a consumable that is usable when the contract for the image forming apparatus is made, the normal consumable being a consumable that is usable regardless of whether the contract is made; and in response to determining that the type information is information indicating the contract consumable, storing identification information in a second memory of a replacement part, the replacement part being used in the image forming apparatus together with the consumable, the identification information being stored in the first memory, the identification information being unique information for identifying the consumable, thereby allowing a use of the consumable in another image forming apparatus together with the replacement part.

11. A control method of controlling an image forming apparatus, the control method comprising:

determining whether the image forming apparatus is in a state where a contract for the image forming apparatus is made;

determining whether type information is information indicating a contract consumable, the type information being stored in a first memory of a consumable attached to the image forming apparatus, the type information indicating whether the consumable is the contract consumable or a normal consumable, the contract consumable being a consumable that is usable when the contract for the image forming apparatus is made, the normal consumable being a consumable that is usable regardless of whether the contract is made, the first memory storing first identification information, the first identification information being unique information for identifying the consumable;

in response to determining that the image forming apparatus is in a state where the contract is made and determining that the type information is information indicating the contract consumable, determining whether a second memory of a replacement part stores the first identification information, the replacement part being used in the image forming apparatus together with the consumable;

in response to determining that the second memory stores the first identification information, writing the first identification information stored in the second memory to an apparatus memory of the image forming apparatus; and after writing the first identification information to the apparatus memory, permitting a use of the consumable in the image forming apparatus together with the replacement part.

* * * * *